US006937741B1

(12) United States Patent
Miyashita

(10) Patent No.: US 6,937,741 B1
(45) Date of Patent: Aug. 30, 2005

(54) IMAGE PROCESSING APPARATUS AND METHOD, AND STORAGE MEDIUM THEREFOR

(75) Inventor: Tomoyuki Miyashita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 943 days.

(21) Appl. No.: 09/722,397

(22) Filed: Nov. 28, 2000

(30) Foreign Application Priority Data

| | | |
|---|---|---|
| Nov. 29, 1999 | (JP) | 11-338235 |
| Nov. 29, 1999 | (JP) | 11-338236 |
| Nov. 29, 1999 | (JP) | 11-338237 |
| Sep. 21, 2000 | (JP) | 2000-287599 |

(51) Int. Cl.[7] .......... G06K 9/00
(52) U.S. Cl. .......... 382/100
(58) Field of Search .......... 382/100, 232; 380/51, 202, 203, 204, 216; 713/176, 179; 348/460; 358/3.28; 356/3.28

(56) References Cited

U.S. PATENT DOCUMENTS

| | | | | |
|---|---|---|---|---|
| 4,331,955 A | * | 5/1982 | Hansen | 345/611 |
| 5,579,405 A | * | 11/1996 | Ishida et al. | 382/197 |
| 5,606,628 A | * | 2/1997 | Miyabe et al. | 382/183 |
| 5,956,420 A | * | 9/1999 | Ikenoue | 382/164 |
| 6,285,774 B1 | * | 9/2001 | Schumann et al. | 382/100 |
| 6,466,209 B1 | * | 10/2002 | Bantum | 345/589 |

* cited by examiner

*Primary Examiner*—Andrew W. Johns
*Assistant Examiner*—Shervin Nakhjavan
(74) *Attorney, Agent, or Firm*—Fitzpatrick, Cella, Harper & Scinto

(57) ABSTRACT

An average of pattern scores of a target binary image is obtained based upon the target binary image and first principal component vectors of a reference pattern, and the average of pattern scores of the target binary image is compared with a reference-pattern score that is based upon a sum total of distances between the first principal component direction of the reference pattern and a standard vector. Feature vector space of the target binary image is translated in accordance with the result of the comparison and access control information to be embedded in the target binary image, and an image is formed upon altering the target binary image based upon the result obtained by translating the feature vector space.

10 Claims, 48 Drawing Sheets

FIG. 6

| VARIATE | t1 | t2 | t3 | t4 | t5 | t6 | t7 | t8 |
|---|---|---|---|---|---|---|---|---|
| VALUE | 1 | 1 | 1 | 0 | 0 | 0 | 0 | 1 |

FIG. 7

$$Hij = (1, 1, 1, 0, 0, 0, 0, 1)$$

FIG. 9

DIST = ( 1, 0, 0, 0, 1, 0, 0, 0 )

F I G. 33
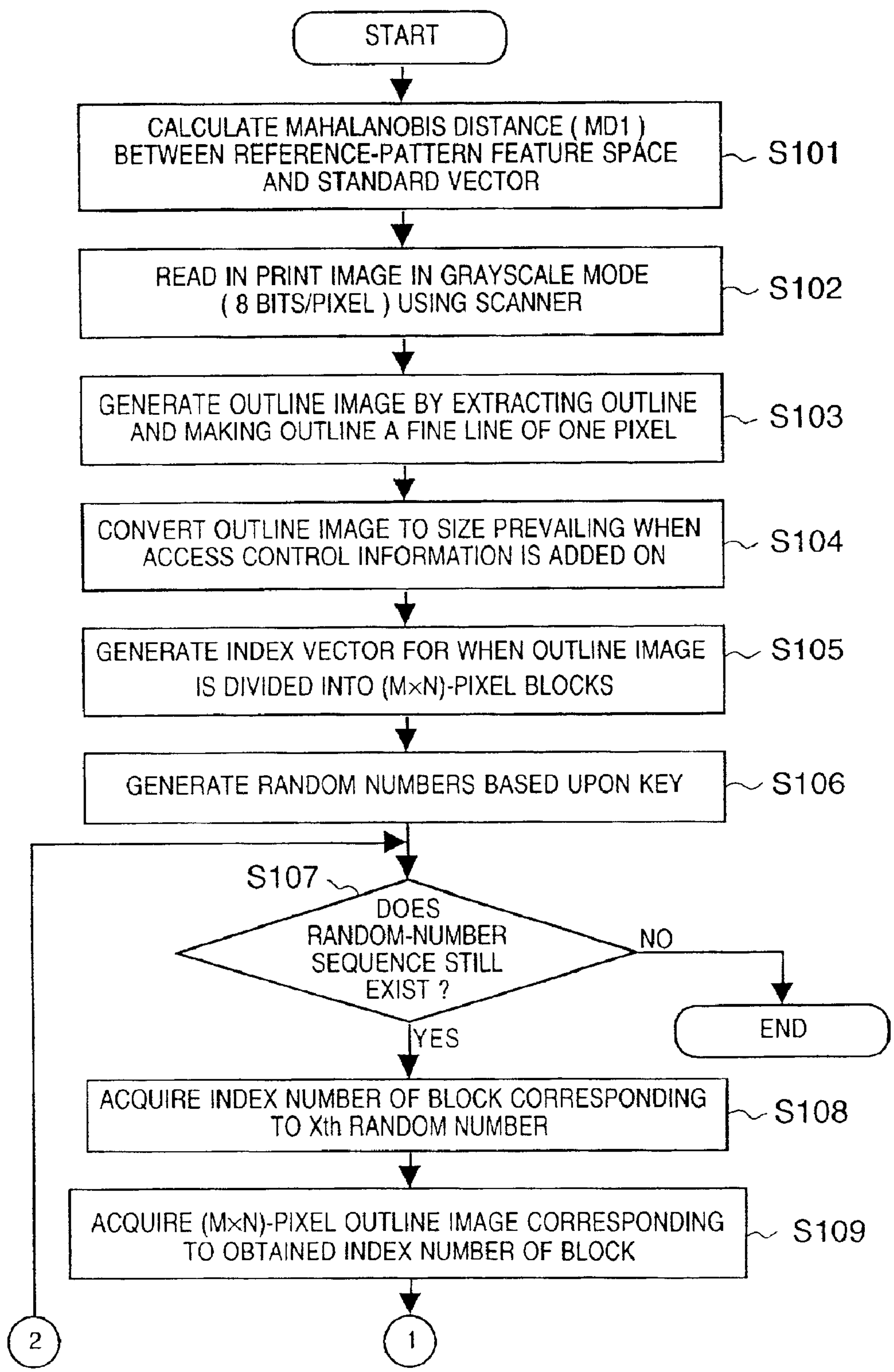

FIG. 35

| VARIATE | t1 | t2 | t3 | t4 | t5 | t6 | t7 | t8 |
|---|---|---|---|---|---|---|---|---|
| VALUE | 0 | 0 | 0 | 1 | 1 | 1 | 1 | 0 |

FIG. 36

$$Hij = (0, 0, 0, 1, 1, 1, 1, 0)$$

FIG. 37

DIST = ( 0, 1, 1, 1, 0, 1, 1, 1 )

FIG. 41

| VARIATE | t1 | t2 | t3 | t4 | t5 | t6 | t7 | t8 |
|---|---|---|---|---|---|---|---|---|
| VALUE | 128 | 150 | 198 | 255 | 240 | 255 | 255 | 0 |

FIG. 42

Hij = ( 128, 150, 198, 255, 240, 255, 255, 0 )

FIG. 44

DIST = ( 0, 255, 255, 255, 0, 255, 255, 255 )

IMAGE PROCESSING APPARATUS AND METHOD, AND STORAGE MEDIUM THEREFOR

FIELD OF THE INVENTION

This invention relates to an image processing apparatus and method for embedding access control information, which is watermark information, in a document image, and to a storage medium therefor.

BACKGROUND OF THE INVENTION

The image quality of images formed by digital image forming devices such as printers and copiers has been greatly improved in recent years and it is possible to use these devices to readily print high-quality images. The reduction in the cost of high-performance scanners, printers and copiers and image processing by computer have made it possible for anyone to obtain desired printed matter with facility. One consequence is the illegal copying of printed matter such as documents, images and photographs. In order to prevent or inhibit the unauthorized use of printed matter by such illegal copying, therefore, access control information in the form of watermark information is embedded in the printed matter.

The access control function generally is implemented by embedding access control information in printed matter in such a manner that it is not visible to the eye, by embedding a bitmap pattern (glyph code, DD code, etc.), which corresponds to the access control information, in the margin of a document, or by scrambling the document image using code. Common methods of implementing the embedding of access control information in such a manner that it will be invisible to the eye include embedding the access control information by controlling the amount of space in an alphabetic character string; rotating characters and embedding the access control information in conformity with the amount of rotation; and enlarging or reducing characters and embedding the access control information in conformity with the enlargement or reduction rate.

FIG. 21 is a diagram useful in describing an example in which access control information is embedded by controlling the amount of space between words in an alphabetic character string. Such a space is indicated at 1701 in FIG. 21. The space is made $p \leftarrow (1+p)(p+s)/s$, $s \leftarrow (1-p)(p+s)/2$ if a watermark bit to be embedded is "0" and is made $p \leftarrow (1-p)(p+s)/2$, $s \leftarrow (1+p)(p+s)$ if a watermark bit to be embedded is "1".

FIGS. 22 and 23 are diagrams illustrating an example in which a character is rotated and access control information is embedded in conformity with the amount of rotation. FIG. 22 illustrates a character before it is rotated and FIG. 22 illustrates a character before it is rotated and FIG. 23 the character after it is rotated. The angle θ through which the character is rotated is indicated at 1901 in FIG. 23.

FIG. 24 is a diagram illustrating an example in which access control information is embedded by enlarging or reducing a character. Numerals 2001 and 2002 denote the original character width and the character width after reduction, respectively. The access control information is embedded in conformity with such enlargement or reduction.

With these methods of embedding access control information, however, the original character or image is clearly deformed and the result is degradation of the original character or image.

Further, with these methods of embedding access control information, it is necessary to read the printed matter with high precision and to read the amount of space between characters, the angle of rotation of a character or the size of a character in accurate fashion in order to detect the access control information that has been embedded. If printing is performed with a small character size and at a high resolution, therefore, it is very difficult to detect the access control information that has been embedded in printed matter.

SUMMARY OF THE INVENTION

Accordingly, an object of the present invention is to provide an image processing apparatus, method and storage medium by which access control information can be embedded in an image without degrading the image.

Another object of the present invention is to provide an image processing apparatus, method and storage medium by which access control information that has been embedded can be read with high precision.

In order to achieve the above objects, an image processing apparatus of the present invention comprises: image input means for inputting an image; extraction means for extracting an outline of the image that has been input by the image input means; vector generating means for generating vector information conforming to state of pixels neighboring each pixel constituting the output that has been extracted by the extraction means; and embedding means for altering the image in accordance with watermark information and embedding the watermark information on the basis of the vector information.

In order to achieve the above objects, an image processing method of the present invention comprises: an image input step of inputting an image; an extraction step of extracting an outline of the image that has been input at the image input step; a vector generating step of generating vector information conforming to state of pixels neighboring each pixel constituting the output that has been extracted at the extraction step; and an embedding step of altering the image in accordance with watermark information and embedding the watermark information on the basis of the vector information.

In order to achieve the above objects, an image processing apparatus of the present invention comprises: arithmetic means for obtaining an average of pattern scores of a target binary image based upon the target binary image and first principal component values of a reference pattern; comparison means for comparing the average of pattern scores of the target binary image and a reference-pattern score that is based upon a sum total of distances between a first principal component direction of the reference pattern and a standard vector; translation means for translating feature vector space of the target binary image in accordance with result of the comparison by said comparison means and access control information to be embedded in the target binary image; and altering means for altering the target binary image based upon a result obtained by translating the feature vector space.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 6 is a diagram illustrating variates, and the values thereof, of the features of the direction indices of the pixel of interest;

FIG. 7 is a diagram in which the variates of the features of the direction indices in FIG. 6 are expressed by a feature vector;

FIG. 9 is a diagram useful in describing the features of the direction indices of the standard vector shown in FIG. 8;

FIG. 33 is a flowchart illustrating processing for extracting access control information, which has been embedded in an image, from the printed image in the third embodiment;

FIG. 35 is a diagram illustrating variates, and the values thereof, of the features of the direction indices of the pixel of interest in a fourth embodiment;

FIG. 36 is a diagram in which the variates of the features of the direction indices in FIG. 35 are expressed by a feature vector of direction indices;

FIG. 37 is a diagram useful in describing the features of the direction indices of the standard vector shown in FIG. 8 in the fourth embodiment of the present invention;

FIG. 41 is a diagram illustrating variates, and the values thereof, of the features of the direction indices of the pixel of interest in the fourth embodiment;

FIG. 42 is a diagram in which the variates of the features of the direction indices in FIG. 41 are expressed by a feature vector of direction indices;

FIG. 44 is a diagram useful in describing the features of the direction indices of the standard vector shown in FIG. 43 in the fourth embodiment;

DESCRIPTION OF THE PREFERRED EMBODIMENTS

Preferred embodiments of the present invention will now be described with reference to the accompanying drawings. Though the following embodiments are described taking a monochrome laser-beam printer (referred to simply as a monochrome LBP below) as an example, the present invention is not limited to such an example and may be applied also to other printers such as ink-jet printer, by way of example.

Here a document image is assumed to be a binary black-and-white image, and a low-cost scanner is used as an image reader for reading printing manner.

First Embodiment

Figure 1:
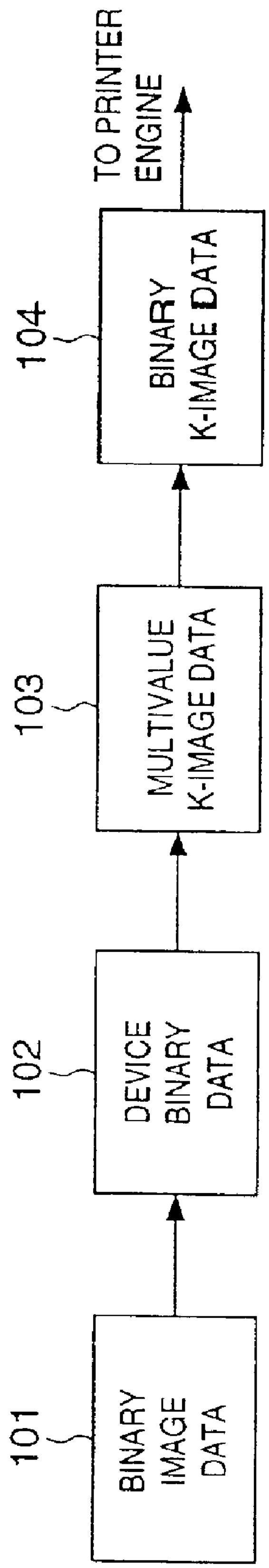
FIG. 1 is a diagram useful in describing the flow of a conversion of document image data according to an embodiment of the present invention.

FIG. 1 is a diagram useful in describing the flow of a conversion of document image data in a monochrome LBP according to a first embodiment of the present invention relating to the embedding of access control information. Here image data representing a document is delivered to the printer driver of a monochrome LBP as binary image data 101. Next, the binary image data 101 is converted to device binary image data 102 that conforms to the characteristic of the printer, then the device binary image data 102 is decomposed into multilevel K-image data 103. The latter is then binarized to binary K-image data 104.

The binary K-image data 104 is delivered to a printer engine and is printed on paper or the like at a high resolution.

Figure 2:
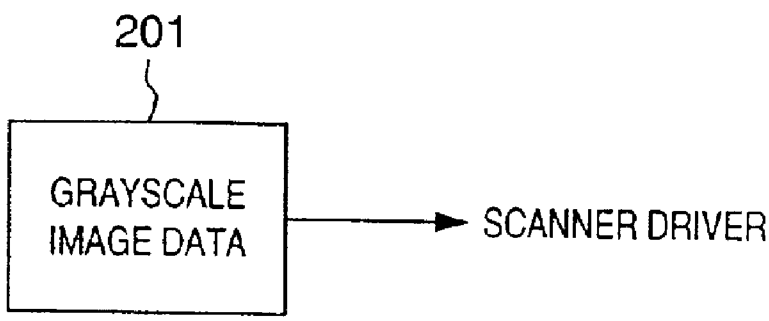
FIG. 2 is a diagram illustrating the flow of image data with regard to reading of access control information by a scanner.

FIG. 2 is a diagram illustrating the flow of a conversion of image data with regard to reading of access control information by a scanner according to the first embodiment of the present invention. In FIG. 2, image data obtained by the scanner which reads a document is supplied to a scanner driver as multi-value of grayscale image data 201.

Feature space of an observation pattern, a standard vector and feature space of a reference pattern according to this embodiment will now be described.

Figure 3:
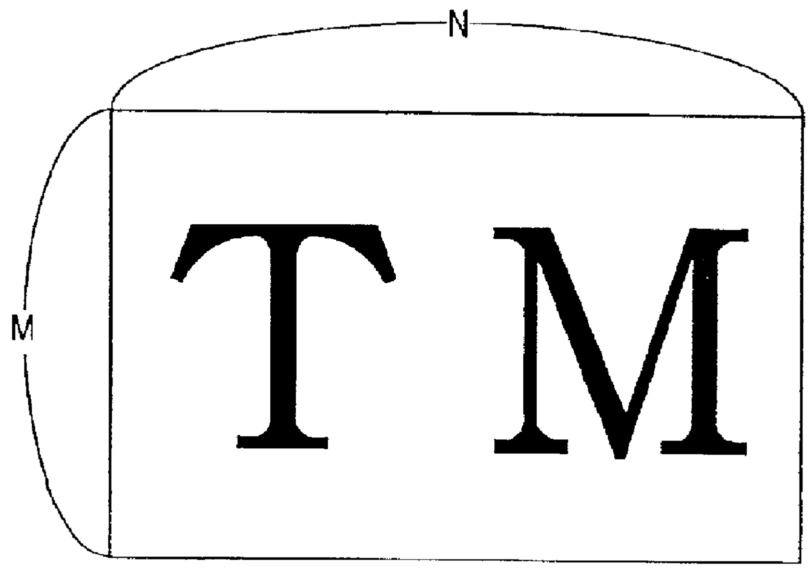
FIG. 3 is a diagram illustrating an example of an observation image (document image) of M×N pixels according to this embodiment.
Figure 4:
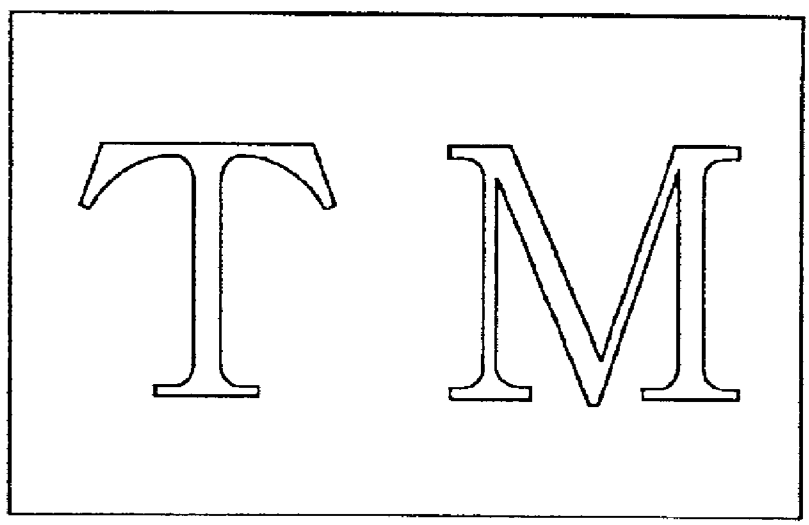
FIG. 4 is a diagram illustrating an example of an outline image in which the outline of the observation image of FIG. 3 is indicated by one pixel width.

FIG. 3 is a diagram illustrating an example of an image of M×N pixels corresponding to part of the binary K-image data 104, and FIG. 4 is a diagram illustrating an example of an outline image in which the outline of the observation image of FIG. 3 is extracted and made a fine line of one pixel width.

Figure 5:
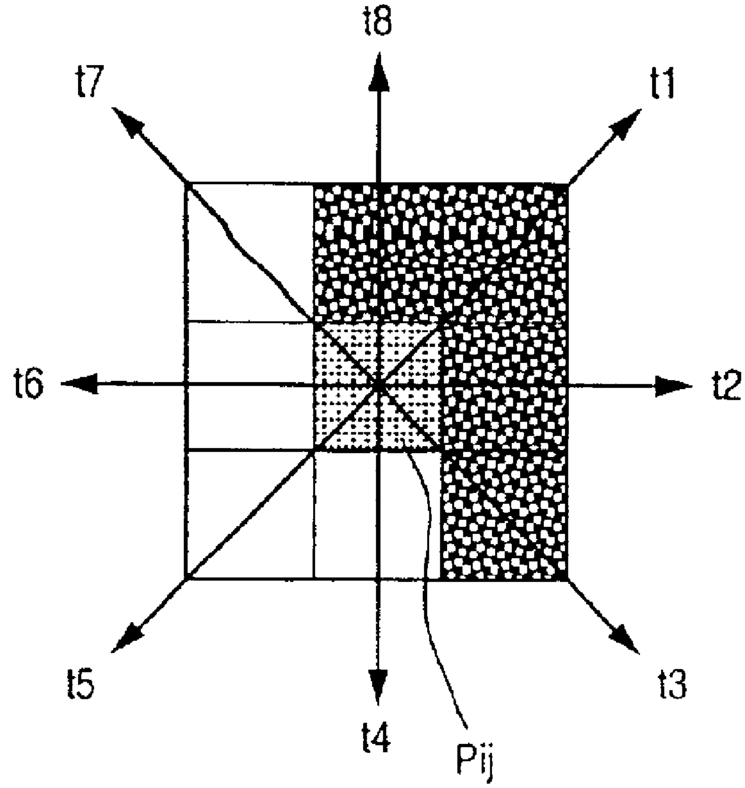
FIG. 5 is a diagram useful in describing features of direction indices of a pixel of interest.

FIG. 5 is a diagram illustrating direction indices for extracting the features of a pixel of interest Pij in a case where the pixel of interest is located at the center of a 3×3 pixel block. FIG. 5 illustrates a case where pixels exist in directions t1, t2, t3, t8 of the pixel of interest but not in directions t4, t5, t6, t7 of the pixel of interest.

FIG. 6 illustrates values corresponding to the features t1, t2, t3, t4, t5, t6, t7 and t8 of the direction indices of the pixel of interest shown in FIG. 5. Here a "1" indicates the presence of a pixel in the direction of the corresponding direction index and a "0" the absence of a pixel in the direction of the corresponding direction index.

Figure 7:
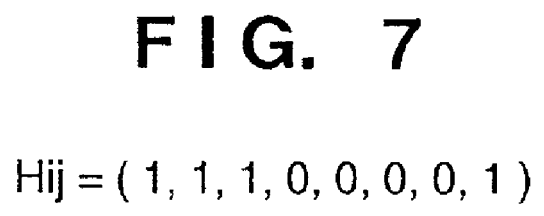

FIG. 7 illustrates vectorization of the features (see FIG. 6) of the direction indices of the pixel of interest Pij shown in FIG. 5. Here the feature vector Hij of the direction indices is a vector of the features of the direction indices of the pixel of interest Pij. This vector has eight dimensions. The feature space of the observation pattern is a set of the feature vectors of the direction indices of each pixel of the outline image shown in FIG. 4. The feature space of the observation pattern has eight dimensions.

Figure 8:
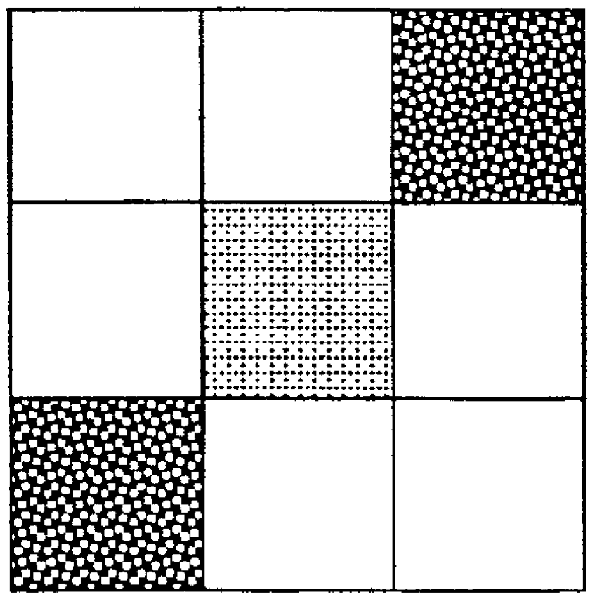
FIG. 8 is a diagram illustrating an example of the image of a standard vector.

FIG. 8 illustrates a standard-vector pattern. The standard vector of this standard-vector pattern represents the features of the direction indices of the pattern. FIG. 9 illustrates a vector DIST indicating the features of these direction indices.

Figure 10:
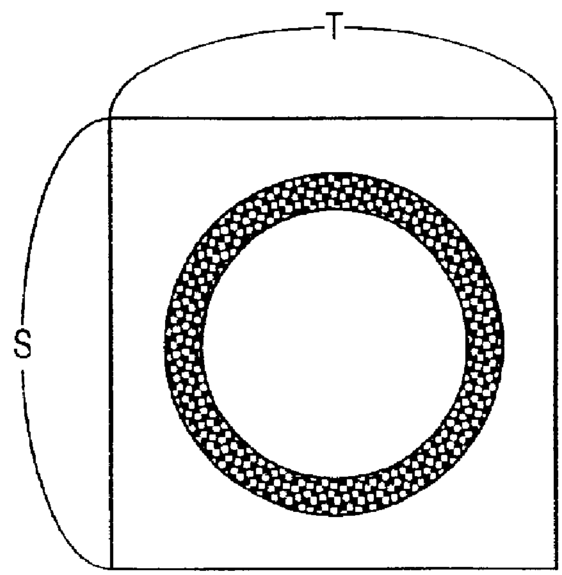
FIG. 10 is a diagram illustrating an example of a reference image composed of S×T pixels.
Figure 11:
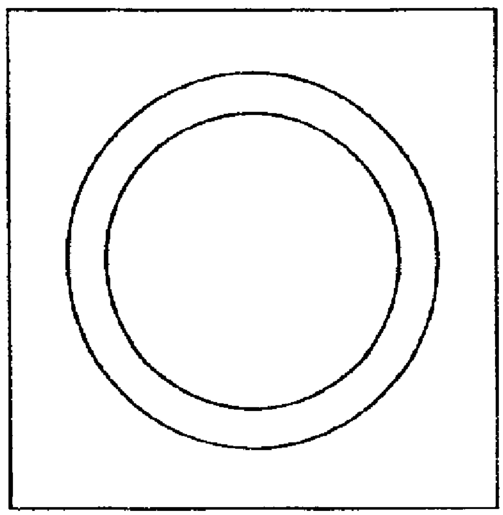
FIG. 11 is a diagram illustrating an example of an outline image in which the outline of the reference image of FIG. 10 is made a fine line of one pixel width.

FIG. 10 is a diagram showing an example of a reference image composed of S×T pixels, and FIG. 11 illustrates the outline image of this image. The feature space of the reference pattern is a set of feature vectors of direction indices of each of the pixels in the outline image. The feature space of the reference pattern has eight dimensions.

A procedure for embedding access control information in a document image will be illustrated next.

Figure 12:
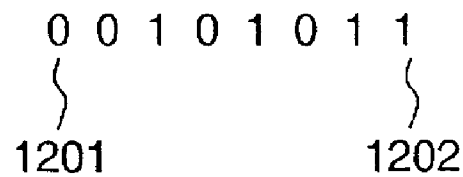
FIG. 12 is a diagram illustrating an example of a bit sequence of access control information.

FIG. 12 is a diagram illustrating an example of a bit sequence of access control information (watermark information). Numerals 1201 and 1202 indicate "0" and "1" bits, respectively.

Figure 13:
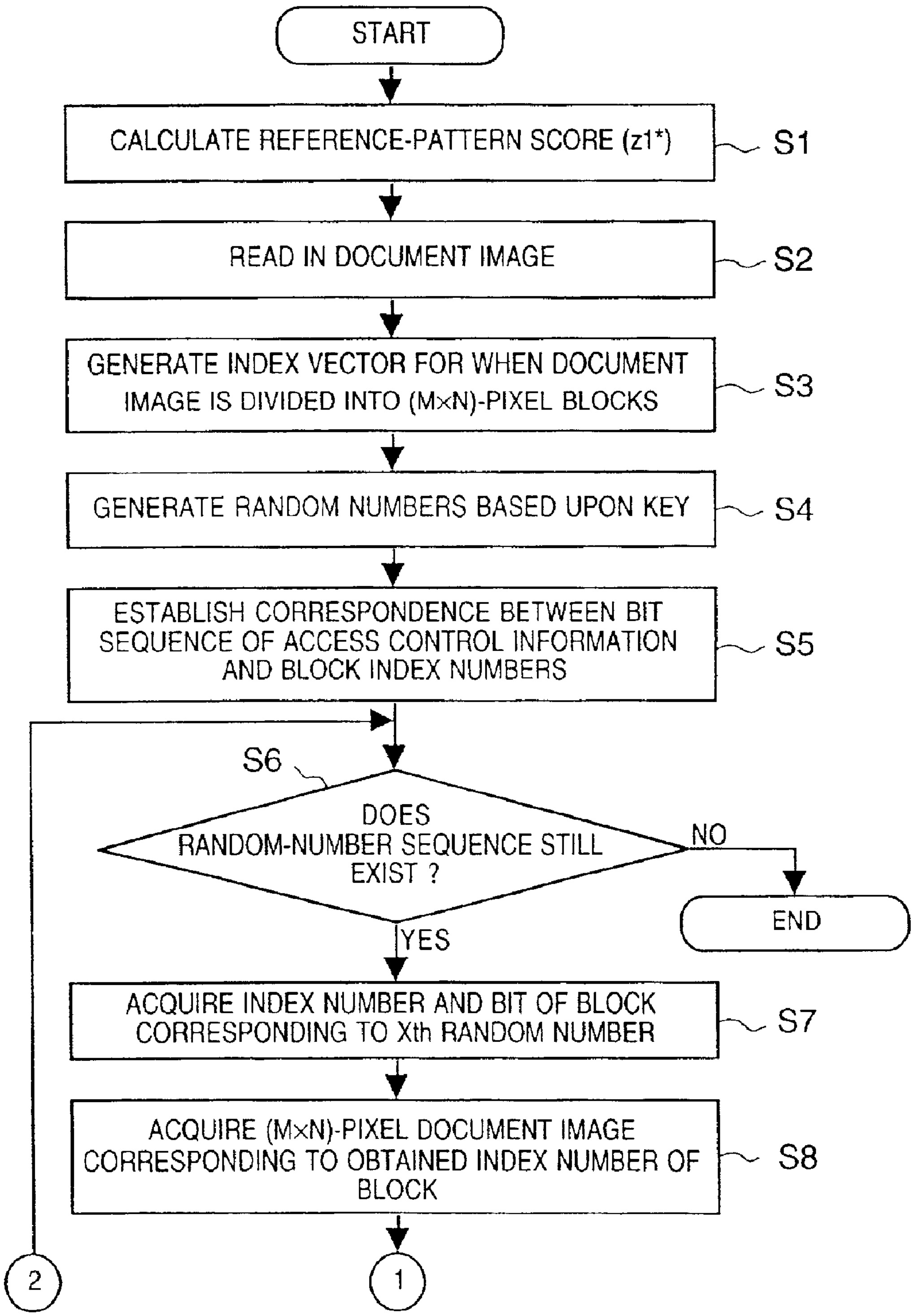
FIG. 13 is a flowchart illustrating processing, which is executed by an image processing apparatus according to a first embodiment of the present invention, for embedding access control information in a document image.
Figure 14:
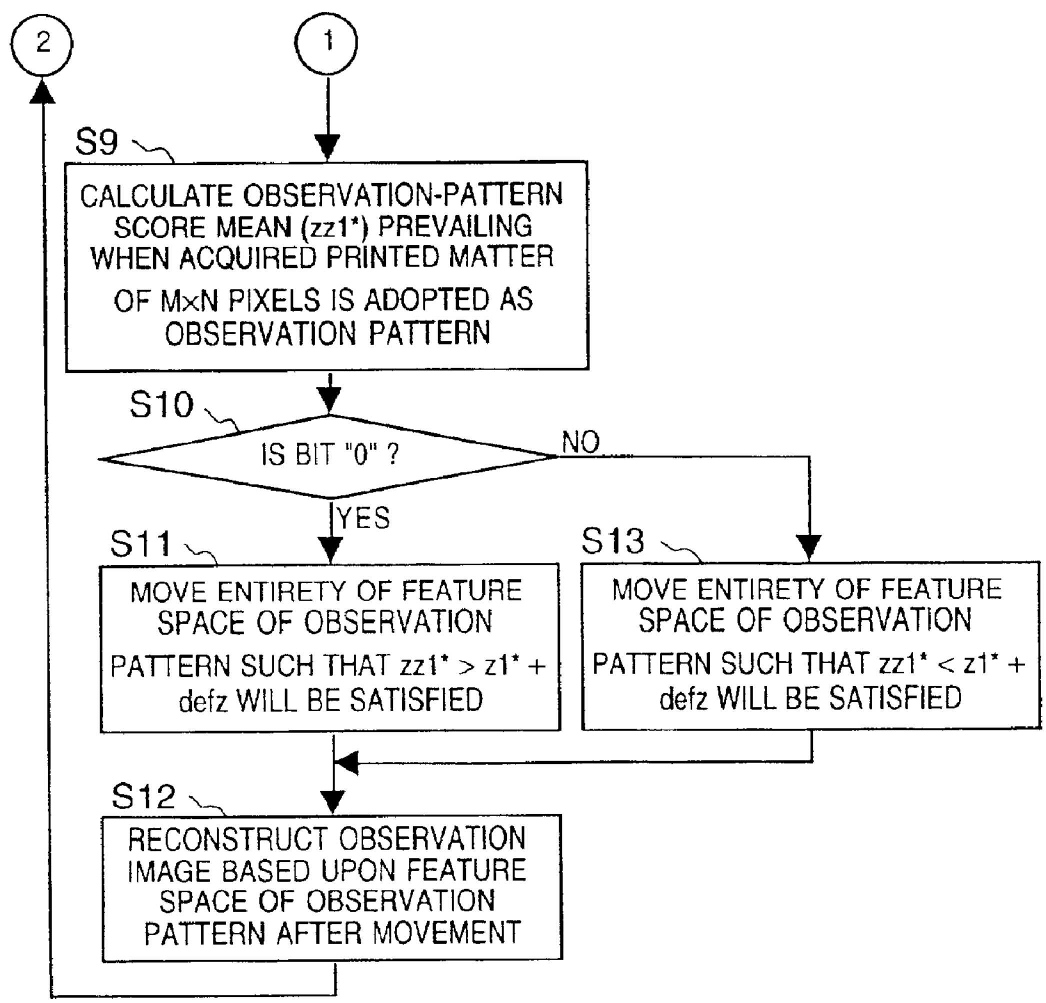
FIG. 14 is a flowchart illustrating processing, which is executed by the image processing apparatus according to the first embodiment, for embedding access control information in a document image.

FIGS. 13 and 14 are flowcharts illustrating processing for embedding access control information (watermark information) in a document image for the purpose of accessing the document image. Operation will be described with reference to these flowcharts.

The score of a reference pattern is calculated from a standard vector and a first principal component of the reference pattern at step S1. This is found on the basis of the following equation (1):

$$z1^* = a11 \cdot x1^* + a12 \cdot x2^* + \ldots a18 \cdot x8^* \qquad \text{Eq. (1)}$$

where z1* represents the reference-pattern score, a11, . . . , a18 represent the component values of a first principal component vector of the reference pattern, and x1*, . . . , x8* represent the component values of the standardized standard vector. It should be noted that a11, . . . , a18 are assumed to be eigenvectors of a correlation matrix of standard vector components x1, . . . , x8. In a case where a standard vector and a reference pattern have already been decided, the score of this reference pattern may be calculated and stored in a memory or the like beforehand.

Figure 15:
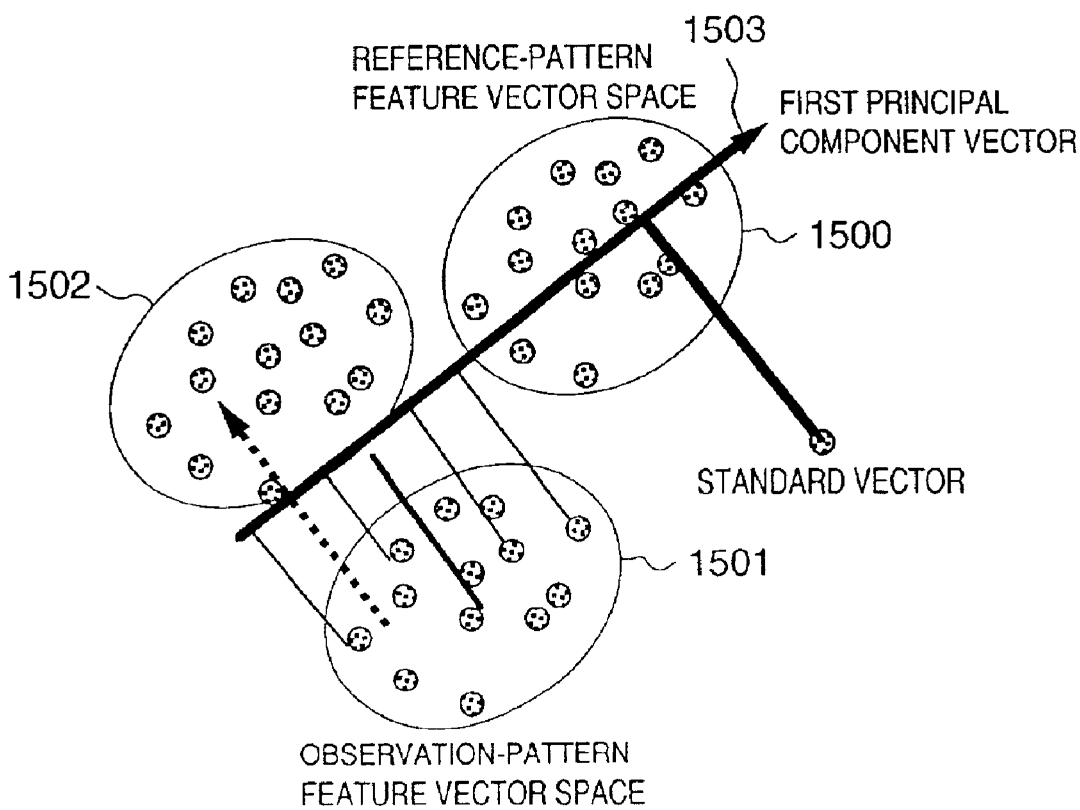
FIG. 15 is a conceptual view illustrating an example wherein a first principal component vector is obtained from the feature vector space of a reference pattern, and the feature vector space of a document image (observation image), in which watermark information is to be embedded, is altered in accordance with the watermark information according to the first embodiment.

FIG. 15 is a conceptual view illustrating an example wherein a first principal component vector is obtained from the feature vector space of a reference pattern, and the feature vector space of a document image (observation image), which is the target image in which watermark information is to be embedded, is altered in accordance with the watermark information.

Numerals 1500 and 1503 in FIG. 15 denote the feature vector space of a reference pattern and the first principal component vector of this reference pattern, respectively. Accordingly, the score z1* of this reference pattern corresponds to the sum total of the linear distances between the components of the first principal component vector and the components of the standard vector.

Figure 16:
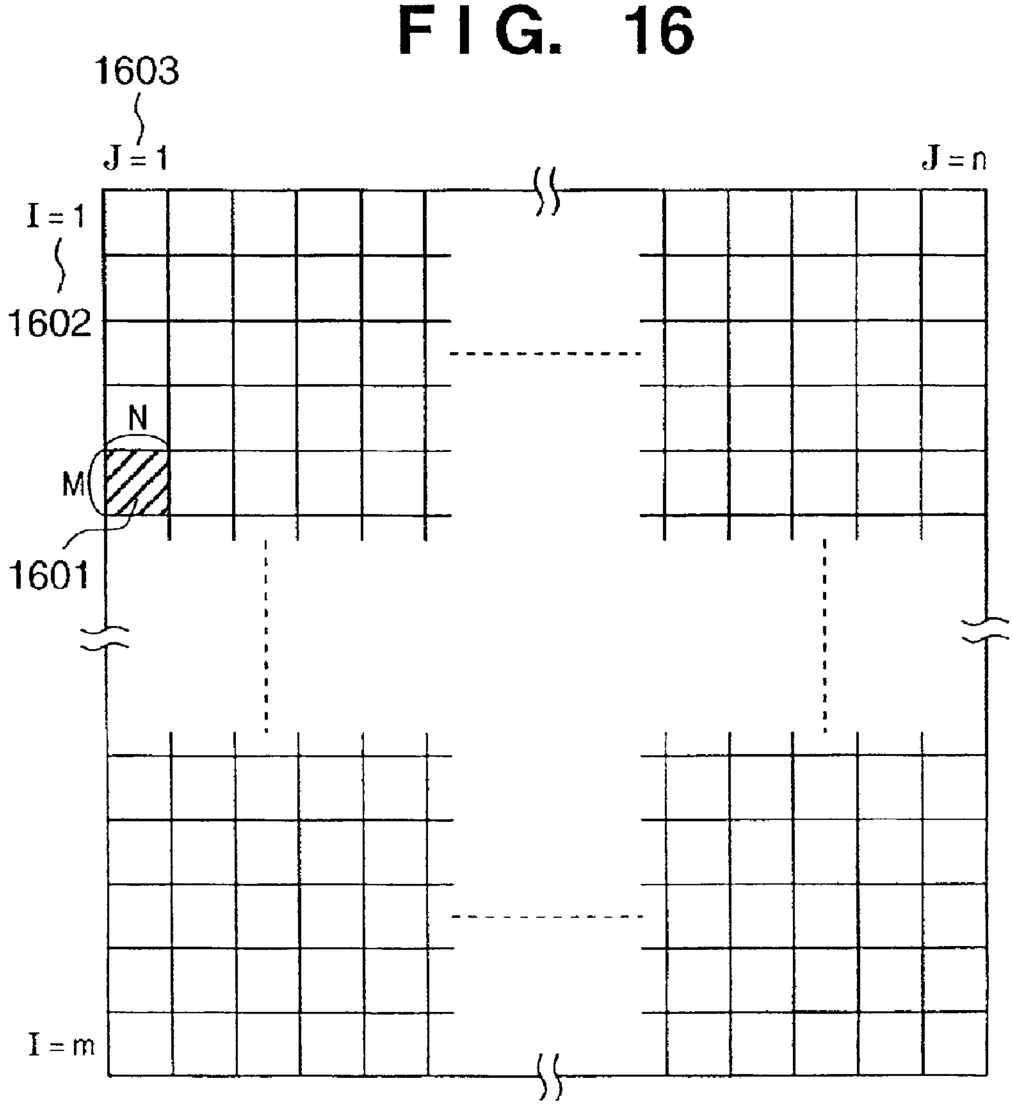
FIG. 16 is a diagram illustrating an example in which a document image has been divided into blocks.

Next, at step S2 in FIG. 13, the document image corresponding to the binary K-image data 104 of FIG. 1 is read in. Control then proceeds to step S3, at which the document image that was read in at step S2 is divided into blocks. Numerals 1601, 1602 and 1603 in FIG. 16 denote a block of M×N pixels, a row-number index of each block and a column-number index of each block, respectively. The index number in FIG. 16 is an m×n matrix. An index vector of m×n dimensions corresponding to the blocks is generated based upon the index matrix. Element numbers of the index vector are the index numbers of the blocks 1601.

Next, at step S4, random numbers from "1" to "m×n" are generated based upon key information decided in advance or entered by the user. The generated random numbers correspond to element numbers of the index vector generated at step S3. In other words, each random-number value corresponds to the index number of a block.

This is followed by step S5, at which the bit sequence (8-bit data) of the access control information shown in FIG. 12 and the index numbers of the blocks are made to correspond. When this mapping reaches the end of the bit sequence (the eighth bit in the example of FIG. 12), the mapping of the next block starts from the beginning (the first bit) of this bit sequence. This bit sequence is thus assigned repeatedly until all blocks are assigned bits of the bit sequence.

Figure 17:
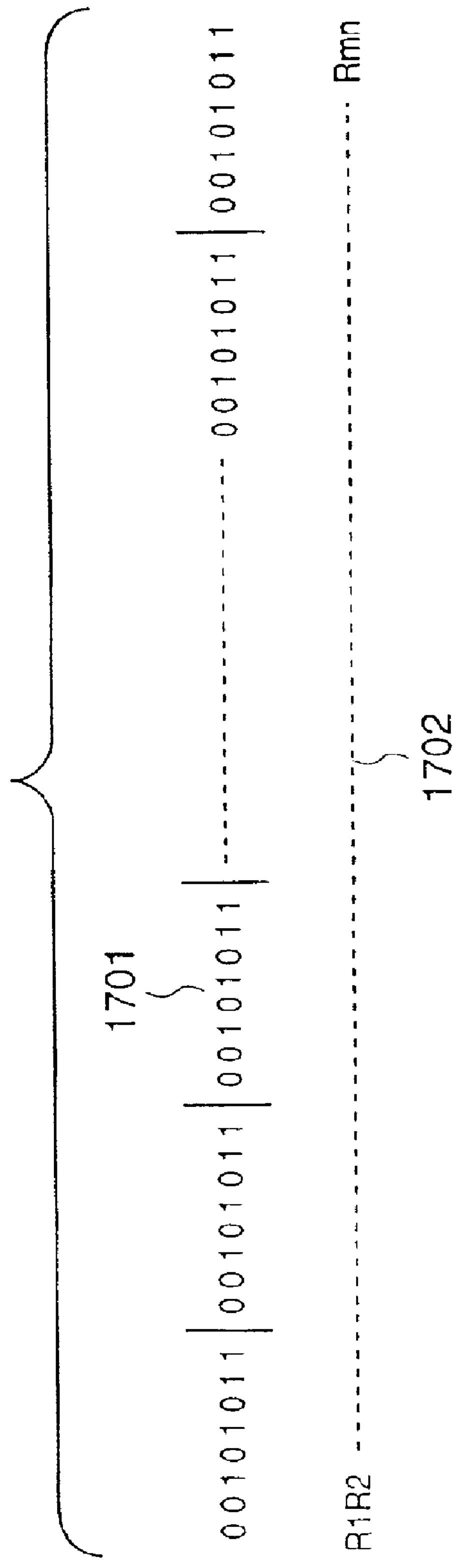
FIG. 17 is a diagram useful in describing an example in which a bit sequence of access control information and a random-number sequence have been assigned to the blocks obtained by division in FIG. 16.

FIG. 17 illustrates an example of correspondence among a bit sequence 1701, which is watermark information, a random-number sequence 1702 generated at step S4 and the index number of each block.

Reference numerals 1701 and 1702 in FIG. 17 represent a bit sequence and a random-number sequence corresponding thereto, respectively. The number of bits in the bit sequences 1701 and the number of random numbers (R1 to Rmn), which are also the index numbers of the respective blocks, are both m×n. Further, the random number R1 in FIG. 17 corresponds to the block of index number (I,J)=(1, 1), the random number R2 corresponds to the block of index number (I,J)=(1,2) and, in similar fashion, the final random number Rmn corresponds to the block of index number (I,J)=(m,n).

Next, at step S6, it is determined whether random-number sequences up to the (m×n)th random-number sequence have been checked. If the (m×n)th random-number sequence has not yet been checked, control proceeds to step S7, at which the index number of the block [I,J=(1,1)] corresponding to the Xth ($1^{st}$) random number (random number R1 in FIG. 17) of the random-number sequence 1702, as well as the value ("0" in the example of FIG. 17) of the bit of bit sequence 1701 that corresponds to this index number, is acquired. Control then proceeds to step S8, at which the (M×N)-pixel block of the document image corresponding to the acquired index number is acquired. This is followed by step S9 (FIG. 14). This step is for calculating the average of the observation-pattern scores, which prevails when the obtained (M×N)-pixel document image is adopted as the observation image, based upon the first principal component values of the reference-pattern that was calculated at step S1. This is found on the basis of the following equation:

$$zz1^* = (a11 \cdot \mu1^* + a12 \cdot \mu2^* + \ldots + a18 \cdot \mu8^*)/p \qquad \text{Eq. (2)}$$

where zz1* represents the average of the observation-pattern score, a11, . . . , a18 represent the first principal component values of the reference pattern, $\mu$1*, . . . , $\mu$8* represent the component values of the feature space of the standardized observation pattern, and p denotes the number of observation points in the feature space of the observation pattern. For example, p indicates the number of outline points of the outline image shown in FIG. 4.

Control then proceeds to step S10, at which it is determined whether the bit of the bit sequence 1701 that corresponds to this block is "0". If the bit is "0", control proceeds to step S11, at which the entire feature space of the observation pattern is moved so as to establish the following relation:

$$zz1^* > z1^* \text{ (observation-pattern score)} + defZ$$

If the bit of bit sequence 1701 corresponding to this block is found to be "1" at step S10, control proceeds to step S13, at which the entire feature space of the observation pattern is moved so as to establish the following relation:

$$zz1^* < z1^* \text{ (observation-pattern score)} + defZ$$

where defZ is a prescribed value set in advance.

In FIG. 15, the feature vector space of the observation pattern is indicated at 1501. Reference number 1502 denotes the feature space of the observation pattern that was moved at step S11 or S13. At the time of such movement, the shift is made in a direction in which there is an increase in the values of the elements of all feature vectors in the feature space of the observation pattern; there is no movement in a direction in which the values of these elements decrease.

Control proceeds from step S11 and S13 to step S12, at which the image data representing the observation image is reconstructed based upon the feature space of the observation pattern after the feature space of the observation pattern has been moved. The above is executed until random-number sequences no longer exist at step S6, i.e., until processing corresponding to the (m×n)th random number is completed.

The binary K-image data thus obtained is output to the printer engine as the binary K-image data 104 of FIG. 1 and is printed by the printer.

Figure 18:
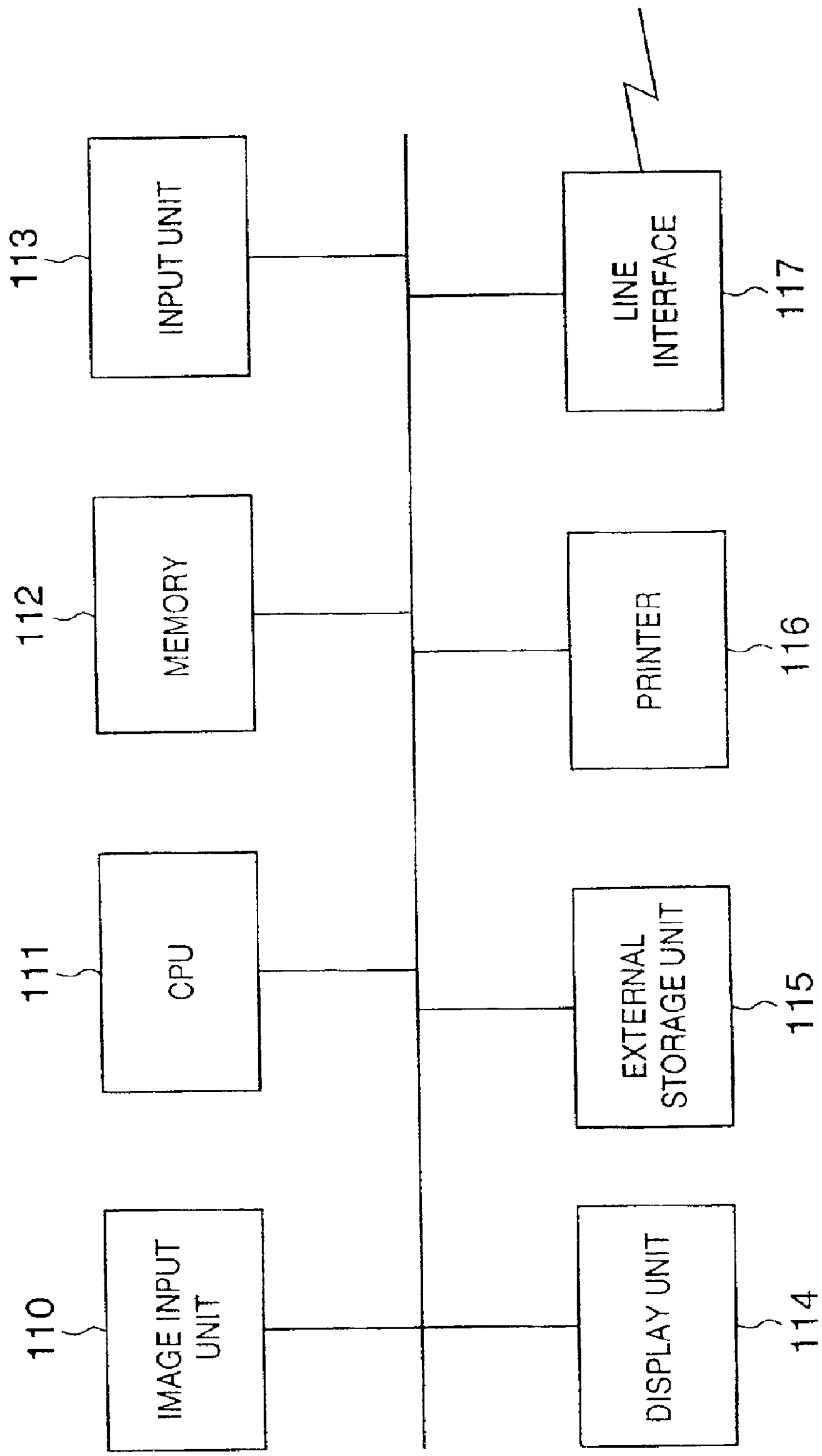
FIG. 18 is a block diagram illustrating the hardware implementation of an image processing apparatus according to the first to fourth embodiments of the present invention.

FIG. 18 is a block diagram illustrating the hardware implementation of an image processing apparatus according to this embodiment of the present invention.

As shown in FIG. 18, the apparatus includes an image input unit 110 for inputting image information. The image input unit 110 may be a scanner, for example, or have a memory device into which a storage medium such as a CD-ROM is inserted and from which the stored image data is input, The image data may be loaded from an external storage device 115 (described later) or may be entered from another network via a line interface (I/F) 117. A CPU 111 controls the overall operation of the apparatus and executes a program (indicated, for example, by the flowcharts of FIGS. 13 and 14) that has been stored in a memory 112. The latter stores temporarily image data used in the above-described processing, stores random numbers, vector information and index information, etc., that has been input and/or generated, and is used as a work area for storing various data when processing is executed by the CPU 111. An input unit 113 has a keyboard and a pointing device such as a mouse. The input unit 113 is operated by an operator to order the generation of the random numbers and to enter various control information.

A display 114 has a CRT or a liquid crystal panel, etc. The external storage device 115, which has a storage medium such as a hard disk or magneto-optic disk, stores various image data and programs, etc. A printer 116 is a laser printer in this embodiment, as mentioned earlier, though the present invention is not limited to a laser printer and may be applied also to an ink-jet printer or the like. The line interface 117 controls communication with another device or network via a communication line.

Described next will be a case where access control information (watermark information) is extracted from an image in which an electronic watermark has been embedded in the manner described above.

Figure 19:
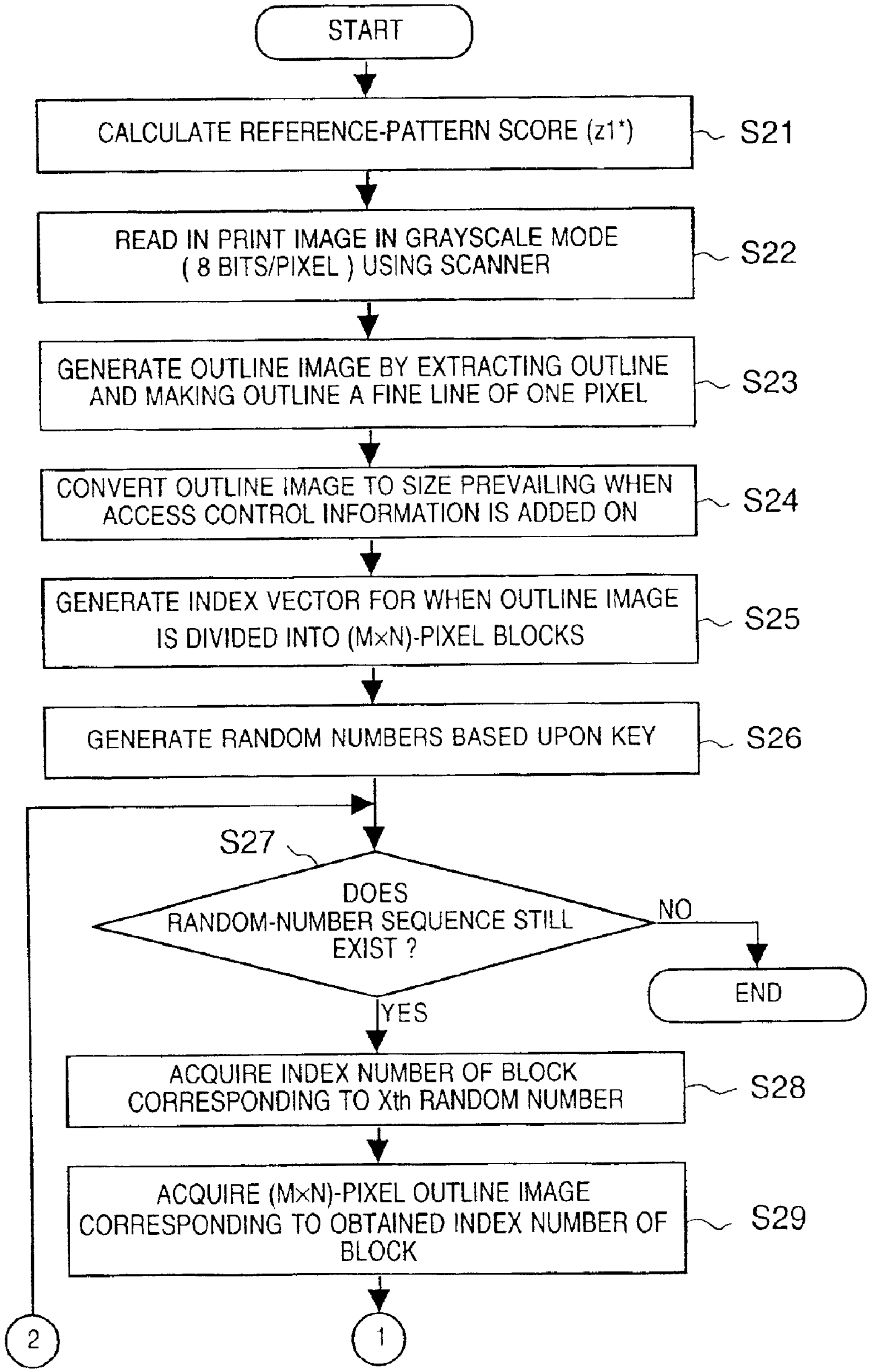
FIG. 19 is a flowchart illustrating processing for extracting access control information, which has been embedded in an image, from the printed image according to the first embodiment.
Figure 20:
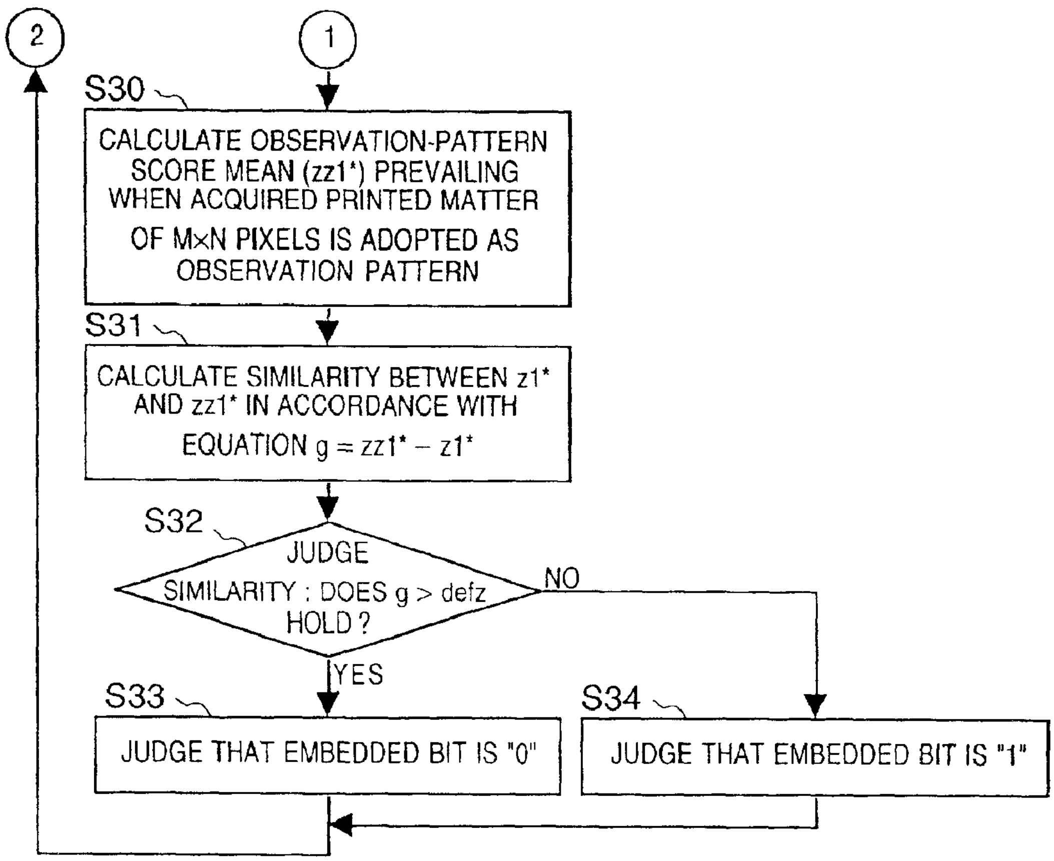
FIG. 20 is a flowchart illustrating processing for extracting access control information, which has been embedded in an image, from the printed image according to the first embodiment.
Figure 21:
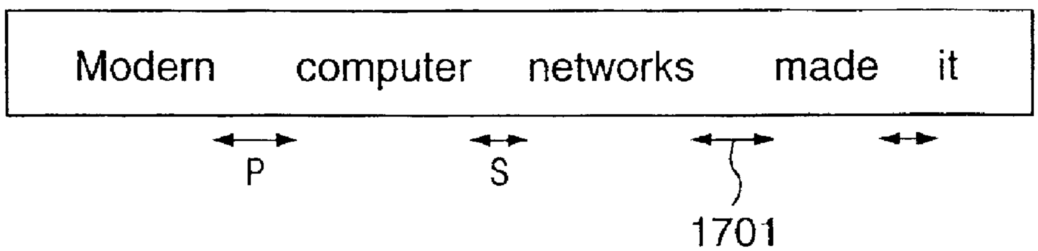
FIG. 21 is a diagram useful in describing an example in which control information is embedded by controlling the amount of space between words.
Figure 22:
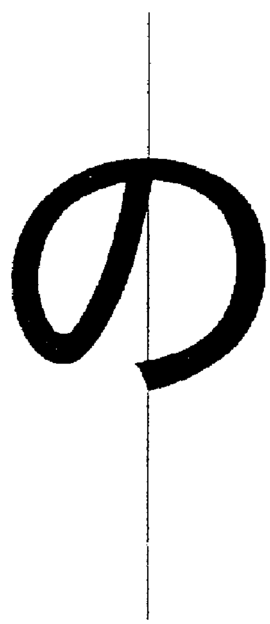
FIG. 22 is a diagram showing a character before it is rotated.
Figure 23:
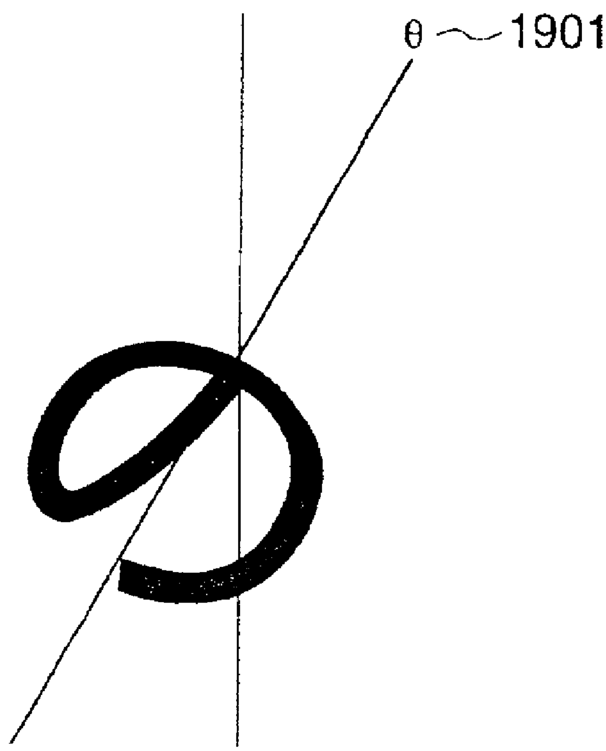
FIG. 23 is a diagram useful in describing processing for embedding control information by rotating a character.
Figure 24:
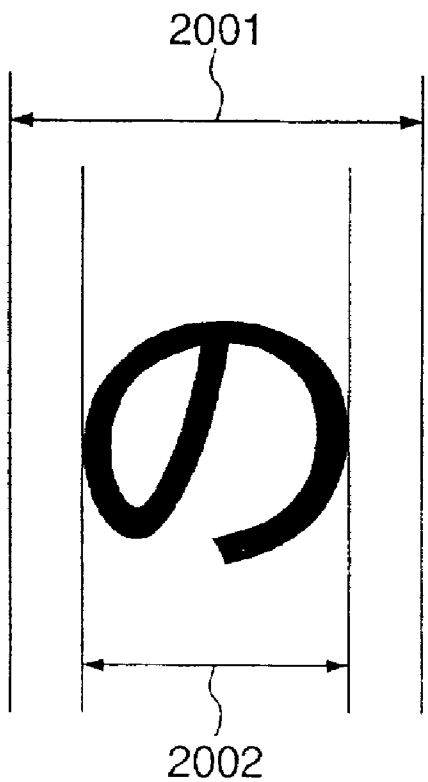
FIG. 24 is a diagram useful in describing an example in which control information is embedded by enlarging or reducing a character.

FIGS. 19 and 20 are flowcharts illustrating processing for extracting access control information from a printed image. The program for executing this processing has been stored in the memory 112 and is executed under the control of the CPU 111.

In a manner similar to that of step S1 in FIG. 13 described above, a step S21 calls for the calculation of a reference-pattern score from a standard vector and the first principal component of a reference pattern. Control then proceeds to step S22, at which the scanner of the image input unit 110 is used to read the printed image in a grayscale mode (8 bits/pixel). This is followed by step S23, at which the outline of the read image is extracted and an outline image in which the outline portion is made a fine line of one pixel, as shown in FIG. 4, for example, is generated. Next, at step S24, the outline image is converted to a size that prevailed when the access control information was added on. The outline image obtained by the conversion is then subjected to the processing set forth below. It should be noted that the processing of steps S26 to S30 in FIGS. 19 and 20 is the same as that of step S4 and steps S6 to S9 in FIGS. 13 and 14 described above.

First, at step S25, the outline image is divided into (M×N)-pixel blocks and an m×n index matrix is generated from the row-number indices and column-number indices of the respective blocks, as shown in FIG. 16. An index vector of m×n dimensions is then generated from the index matrix. The element numbers of the index vector are the index numbers of the respective blocks.

Control then proceeds to step S26, at which 1 to m×n random numbers are generated based upon key information decided in advance or entered by the user. The generated random numbers correspond to the element numbers of the index vector generated at step S25. In other words, each random-number value corresponds to the index number of a block. Next, at step S27, it is determined whether a random-number sequence still exists, i.e., whether the processing of all blocks has been completed. If processing has not been completed for all blocks, control proceeds to step S28, at which the index number of the block corresponding to the Xth (1st) random number (random number R1) is acquired. This is followed by step S29, at which the (M×N)-pixel outline image corresponding to the index number of the acquired block is obtained. Control then proceeds to step S30. This step is for calculating the average of the observation-pattern scores, which prevails when the obtained (M×N)-pixel document image is adopted as the observation image, based upon the first principal component score of the reference-pattern that was calculated at step S21. This can be found in accordance with Equation (2) cited above.

Next, control proceeds to step S31, at which the degree of similarity (g) between the reference-pattern score (z1*) and the average (zz1*) of the observation-pattern scores thus obtained is calculated. The degree of similarity (g) at this time is calculated in accordance with the following equation:

$$g = zz1^* - z1^*$$

Next, at step S32, the calculated similarity (g) and a predetermined value (defZ) are compared. If g>defZ holds, control proceeds to step S33 and it is decided that the embedded bit is "0". If it is found that g>defZ does not hold at step S32, then control proceeds to step S34, at which it is decided that the embedded bit is "1". Control returns to step S27 after step S33 or step S34 is executed. The processing of steps S28 to S34 is executed repeatedly until the above-described processing is applied to the (m×n)th random number. Thus, a number of decisions are rendered on the basis of the extracted bit sequence and the bit length that prevailed when the access control information was embedded is reproduced.

Thus, in accordance with the first embodiment as described above, desired control information can be embedded without degrading the image that receives the embedded information.

Further, control information that has been embedded in an image can be read and detected with high precision.

Second Embodiment

Figure 25:
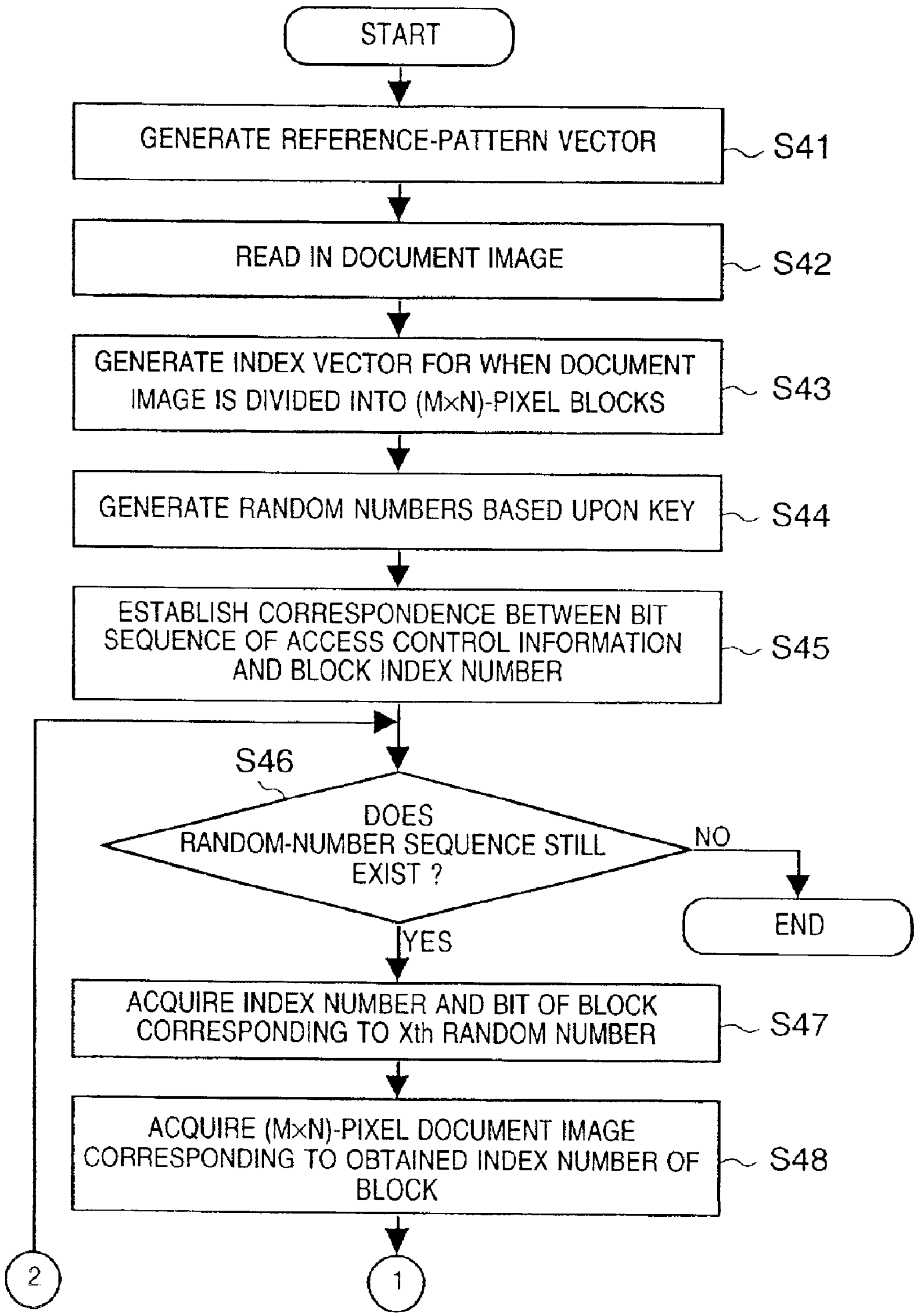
FIG. 25 is a flowchart illustrating processing, which is executed by an image processing apparatus according to a second embodiment of the present invention, for embedding access control information in a document image.
Figure 26:
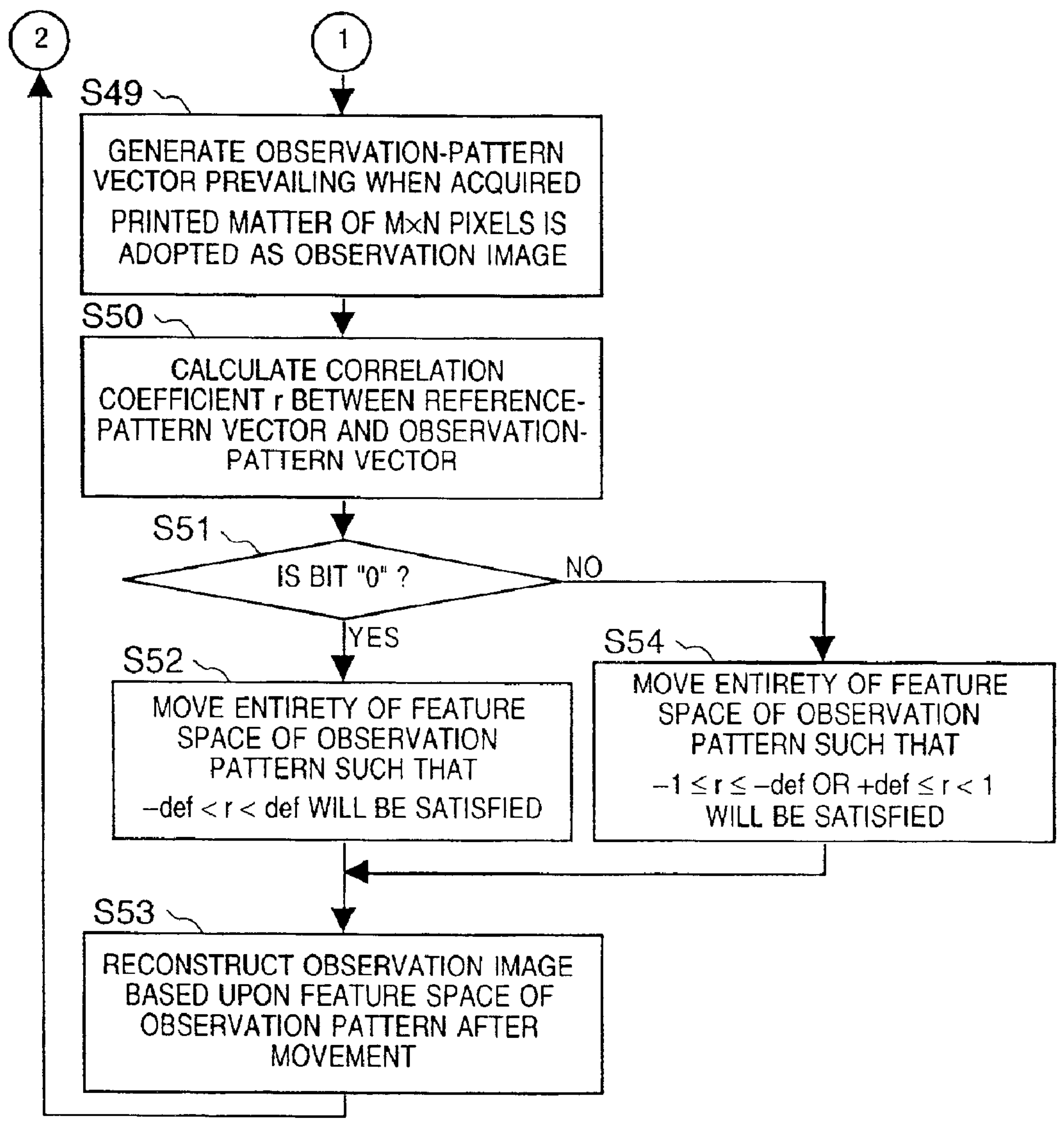
FIG. 26 is a flowchart illustrating processing, which is executed by the image processing apparatus according to the second embodiment, for embedding access control information in a document image.

FIGS. 25 and 26 are flowcharts illustrating processing for embedding access control information (watermark information) in a document image for the purpose of accessing the document image. Operation will be described with reference to these flowcharts.

A reference-pattern vector is generated from the standard vector (see FIG. 9) and a reference-pattern center vector. The reference-pattern center vector (center) is found in accordance with Equation (3) below.

$$\text{center} = \mu 1 / \sqrt{(x1)} \qquad \text{Eq. (3)}$$

where x1 represents a variance vector of the reference-pattern feature space, $\mu$1 is the average vector of the reference-pattern feature space and "center" denotes the center vector of the reference pattern.

Next, at step S42 in FIG. 25, the document image corresponding to the binary K-image data 104 of FIG. 1 is read in. Control then proceeds to step S43, at which the document image that was read in at step S2 is divided into blocks in the manner shown in FIG. 16. Numerals 1601, 1602 and 1603 in FIG. 16 denote a block of M×N pixels, a row-number index of each block and a column-number index of each block, respectively. The index number in FIG. 16 is an m×n matrix. An index vector of m×n dimensions corresponding to the blocks is generated based upon the index matrix. Element numbers of the index vector are the index numbers of the blocks 1601.

Next, at step S44, random numbers from "1" to "m×n" are generated based upon key information decided in advance or entered by the user. The generated random numbers correspond to element numbers of the index vector generated at step S43. In other words, each random-number value corresponds to the index number of a block.

This is followed by step S45, at which the bit sequence (8-bit data) of the access control information shown in FIG. 12 and the index numbers of the blocks are made to correspond. When this mapping reaches the end of the bit sequence (the eighth bit in the example of FIG. 12), the mapping of the next block starts from the beginning (the first bit) of this bit sequence. This bit sequence is thus assigned repeatedly until all blocks are assigned bits of the bit sequence.

FIG. 17 illustrates an example of correspondence among the bit sequence 1701, which is watermark information, the random-number sequence 1702 generated at step S44 and the index number of each block.

Reference numerals 1701 and 1702 in FIG. 17 represent the bit sequence and the random-number sequence corresponding thereto, respectively. The number of bits in the bit sequence 1701 and the number of random numbers (R1 to Rmn), which are also the index numbers of the respective blocks, are both m×n. Further, the random number R1 in FIG. 17 corresponds to the block of index number (I,J)=(1, 1), the random number R2 corresponds to the block of index number (I,J)=(1,2) and, in similar fashion, the final random number Rmn corresponds to the block of index number (I,J)=(m,n).

Control proceeds to step S46. Next, the index number of the block [I,J=(1,1)] corresponding to the Xth ($1^{st}$) random number (random number R1 in FIG. 17) of the random-number sequence 1702, as well as the value ("0" in the example of FIG. 17) of the bit of bit sequence 1701 that corresponds to this index number, is acquired (step S47). Control then proceeds to step S48, at which the (M×N)-pixel block of the document image (the block I=J=1 in FIG. 16) corresponding to the acquired index number is acquired. This is followed by step S49 (FIG. 26). This step is for generating an observation-pattern vector from an observation-pattern center vector of the feature space of an observation pattern when the obtained M×N document image is adopted as an observation image, and the standard vector. The observation-pattern center vector is found in accordance with Equation (4) below.

$$\text{center}=\mu\mathbf{2}/\sqrt{(x\mathbf{2})} \qquad \text{Eq. (4)}$$

where x2 represents a variance vector of the observation-pattern feature space, $\mu$2 is the average vector of the observation-pattern feature space and "center" denotes the center vector of the reference pattern.

Control then proceeds to step S50, at which a correlation coefficient (r) between the reference-pattern vector generated at step S41 and the observation-pattern vector generated at step S49 is calculated.

Next, at step S51, it is determined whether the bit of the bit sequence 1701 that corresponds to this block is "0". If the bit is "0", control proceeds to step S52, at which the entire feature space of the observation pattern is moved so as to establish the following relation:

$$-def<r<def$$

If the bit of bit sequence 1701 corresponding to this block is found to be "1" at step S50, control proceeds to step S54, at which the entire feature space of the observation pattern is moved so as to establish the following relation:

$$-1\leqq r\leqq -def \text{ or } def\leqq r\leqq 1$$

where "def" represents a value that is set is advance and 0≦def≦1 holds.

Movement of the feature space at steps S52 and S54 is made in a direction in which there is an increase in the values of the elements of all feature vectors in the feature space of the observation pattern; there is no movement in a direction in which the values of these elements decrease.

Control proceeds from step S52 and S54 to step S53, at which the image data representing the observation image (the document image) is reconstructed based upon the feature space of the observation pattern after the feature space of the observation pattern has been moved. The above is executed until random-number sequences no longer exist at step S46, i.e., until processing corresponding to the (m×n)th random number is completed.

The binary K-image data thus obtained is output to the printer engine as the binary K-image data 104 of FIG. 1 and is printed by the printer.

It should be noted that the hardware implementation of the image processing apparatus according to the second embodiment is identical with that of FIG. 18 and need not be described again.

Described next will be a case where access control information (watermark information) is extracted from an image in which an electronic watermark has been embedded in the manner described above.

Figure 27:
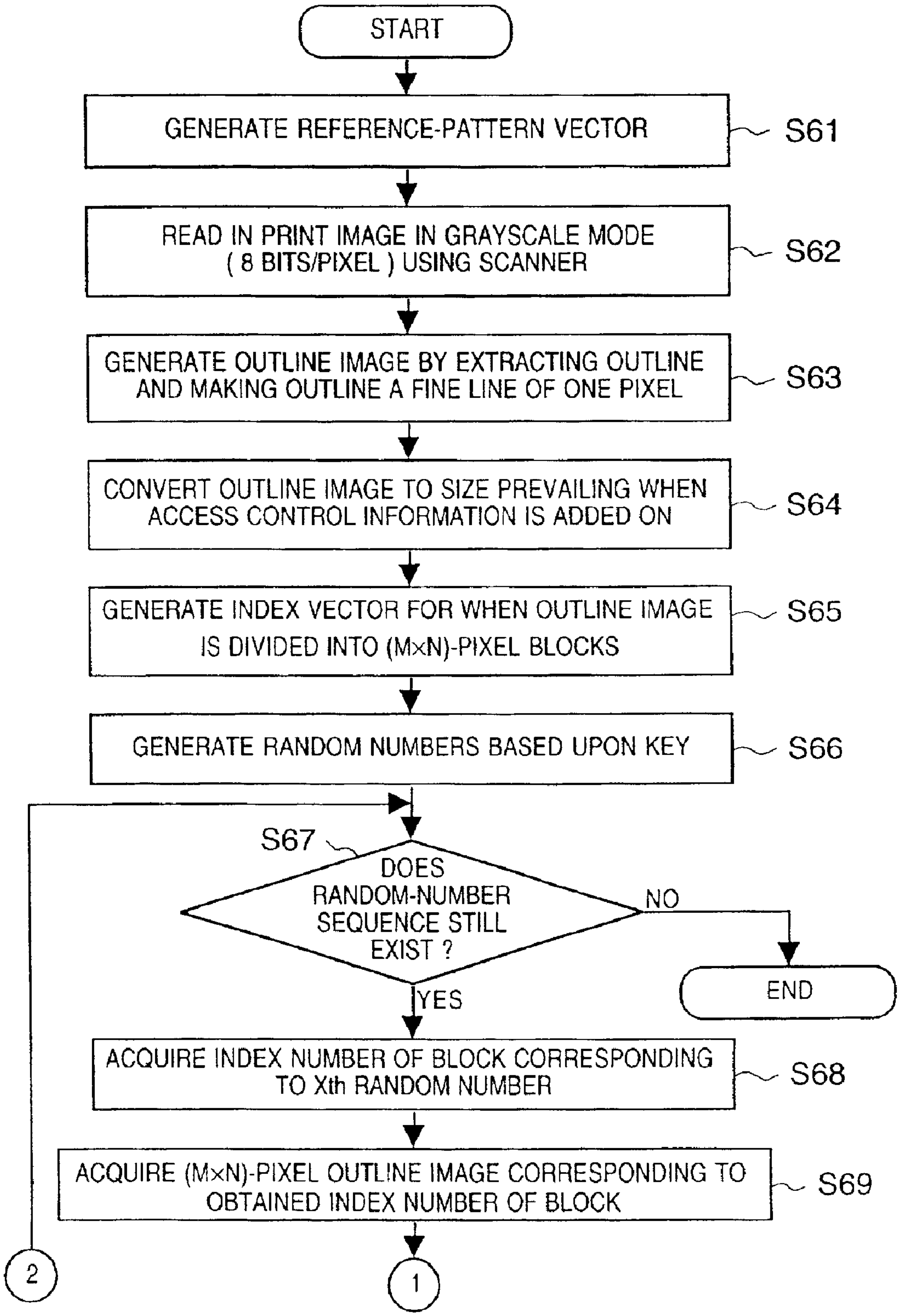
FIG. 27 is a flowchart illustrating processing for extracting access control information, which has been embedded in an image, from the printed image.
Figure 28:
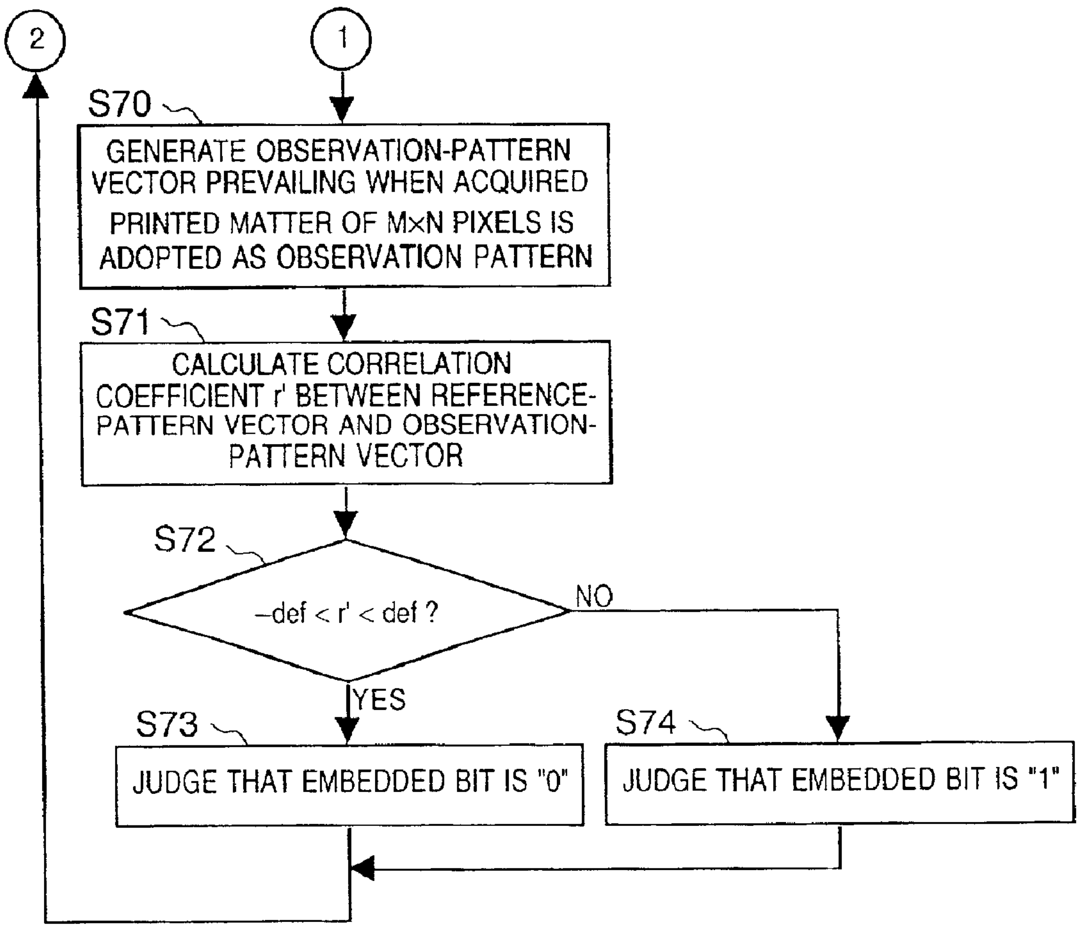
FIG. 28 is a flowchart illustrating processing for extracting access control information, which has been embedded in an image, from the printed image.

FIGS. 27 and 28 are flowcharts illustrating processing for extracting access control information from an image printed upon having the watermark information embedded therein. The program for executing this processing has been stored in the memory 112 and is executed under the control of the CPU 111.

In a manner similar to that of step S41 in FIG. 25 described above, a step S61 calls for the generation of a reference-pattern vector from a standard vector and reference-pattern center vector. The reference-pattern center vector is in accordance with Equation (3) above. Control then proceeds to step S62, at which the scanner of the image input unit 110 is used to read the printed image in a grayscale mode (8 bits/pixel). This is followed by step S63, at which the outline of the read image is extracted and an outline image in which the outline portion is made a fine line of one pixel width, as shown in FIG. 4, for example, is generated. Next, at step S64, the outline image is converted to a size that prevailed when the access control information was added on. The outline image obtained by the conversion is then subjected to the processing set forth below. It should be noted that the processing of steps S65 to S70 in FIGS. 27 and 28 is basically the same as that of step S44 and steps S46 to S49 in FIGS. 25 and 26 described above. At step S68, however, only the index number of the block corresponding to the Xth random number of the random-number sequence is extracted. This processing differs from that of step S47 in FIG. 25.

More specifically, at step S65, the outline image is divided into (M×N)-pixel blocks and an m×n index matrix is generated from the row-number indices and column-number indices of the respective blocks, as shown in FIG. 16. An index vector of m×n dimensions is then generated from the index matrix. The element numbers of the index vector are the index numbers of the respective blocks.

Control then proceeds to step S66, at which 1 to m×n random numbers are generated based upon key information decided in advance or entered by the user. The generated random numbers correspond to the element numbers of the index vector generated at step S65. In other words, each random-number value corresponds to the index number of a block. Next, at step S67, it is determined whether a random-number sequence still exists, i.e., whether the processing of all blocks has been completed. If processing has not been completed for all blocks, control proceeds to step S68, at which the index number of the block corresponding to the Xth ($1^{st}$) random number (random number R1) is acquired. This is followed by step S69, at which the (M×N)-pixel outline image corresponding to the index number of the acquired block is obtained. Control then proceeds to step S70 (FIG. 28). This step is for generating an observation-pattern vector from an observation-pattern center vector of the feature space of an observation pattern when the obtained (M×N)-pixel document image is adopted as an observation image, and the standard vector. The observation-pattern center vector is found in accordance with Equation (4) cited above.

Control then proceeds to step S71, at which a correlation coefficient (r') between the reference-pattern vector thus obtained and the observation-pattern is calculated. The correlation coefficient (r') and a predetermined value are compared at step S72. If the following relation:

$$-def<r'<def$$

holds, control proceeds to step S73 and it is decided that the embedded bit is "0". If it is found that the above relation does not hold at step S72, then control proceeds to step S74 and it is decided that the embedded bit is "1". Here "def" is a value set in advance and it is assumed that 0≦def≦1 holds.

Control returns to step S67 after step S73 or step S74 is executed. The processing of steps S68 to S74 is executed repeatedly until the above-described processing is applied to the (m×n)th random number (Rmn). Thus, a number of decisions are rendered on the basis of the extracted bit sequence and the bit length that prevailed when the access control information was embedded is reconstructed.

Figure 29:
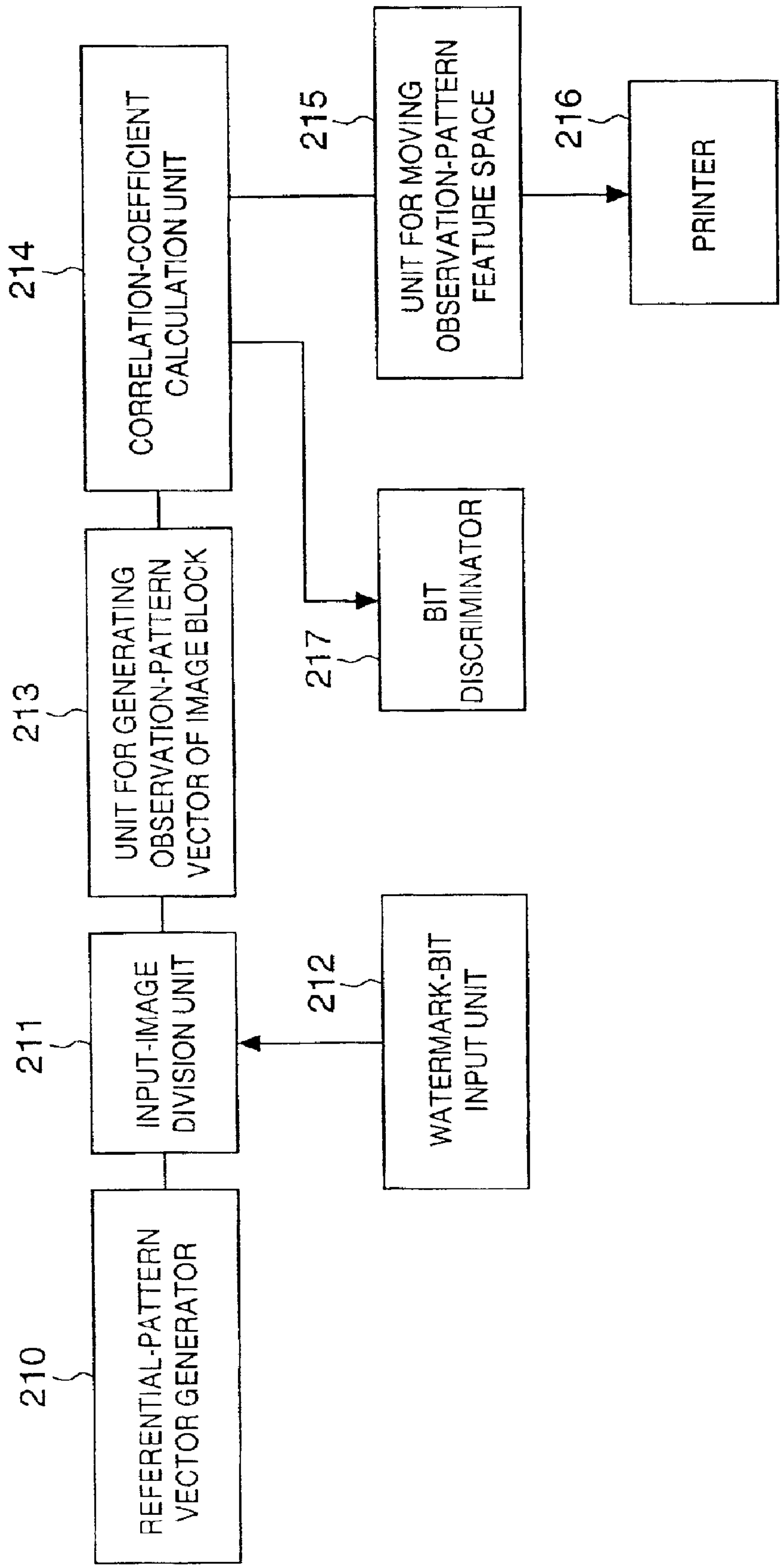
FIG. 29 is a functional block diagram illustrating the functional construction of the image processing apparatus according to the second embodiment.

FIG. 29 is a functional block diagram illustrating the functional construction of the image processing apparatus according to the second embodiment of the present invention.

As shown in FIG. 29, the apparatus includes a reference-pattern vector generator 210 for generating a reference-pattern vector based upon the standard vector of FIG. 9 and the center vector [indicated by Equation (3)] of the reference pattern shown in FIG. 11, by way of example. An input-image division unit 211 divides the outline image (e.g., FIG. 4) of the image, which has been read by a scanner or the like, into a plurality of blocks, represents each block by an index and assigns each bit of access control information, which has been input from a watermark-bit input unit 212, to each block. The apparatus further includes a unit 213 for generating an observation-pattern vector of an image block. Specifically, on the basis of the center vector of an outline pattern (observation pattern) of a certain image block and a standard vector, the unit 213 generates the vector of this observation pattern. A correlation-coefficient calculation unit 214 finds a correlation coefficient between the reference-pattern vector found by the reference-pattern vector generator 210 and the observation-pattern vector found by the unit 213. A unit 215 moves the feature space of the observation pattern. Specifically, if the value of a bit of the access control information to be embedded in the image block is "0", the unit 215 moves the feature space of the observation pattern in such a manner that the correlation coefficient r between the reference-pattern vector and the observation-pattern vector will satisfy the relation −def<r<def. If the value of the bit is "1", the unit 215 moves the feature space of the observation pattern in such a manner that the correlation coefficient r will satisfy the relation −1<r<−def or def≦r≦1. A printer unit 216 prints the observation pattern which has been modified on the basis of the observation pattern vector whose the feature space of the observation pattern has been moved. The above description shows a flow of processing for printing an image which embeds the access control information into input image data.

Next, the description for reading a document image embedding access information and extracting the access information will be explained. The input-image division unit 211 reads the printed document image and extracts an outline image of the document image and divides the outline image into a plurality of blocks. The observation pattern vector generation unit 213 acquires the vector of this observation pattern of the document image. The correlation-coefficient calculation unit 214 calculates a correlation coefficient r' between the reference-pattern vector and the observation-pattern vector found by the unit 213. A bit discriminator 217 determines that the embedded bit is "0" if the correlation coefficient r' satisfies with the condition of −def<r'<def, alternatively, the embedded bit is "1" if the correlation coefficient r' does not satisfy. The access control information that has been embedded in an image can thus be extracted.

Thus, in accordance with the second embodiment, as described above, desired control information can be embedded in an image without the degrading the image.

Further, control information that has been embedded in an image can be read and detected with high precision.

Third Embodiment

Figure 30:
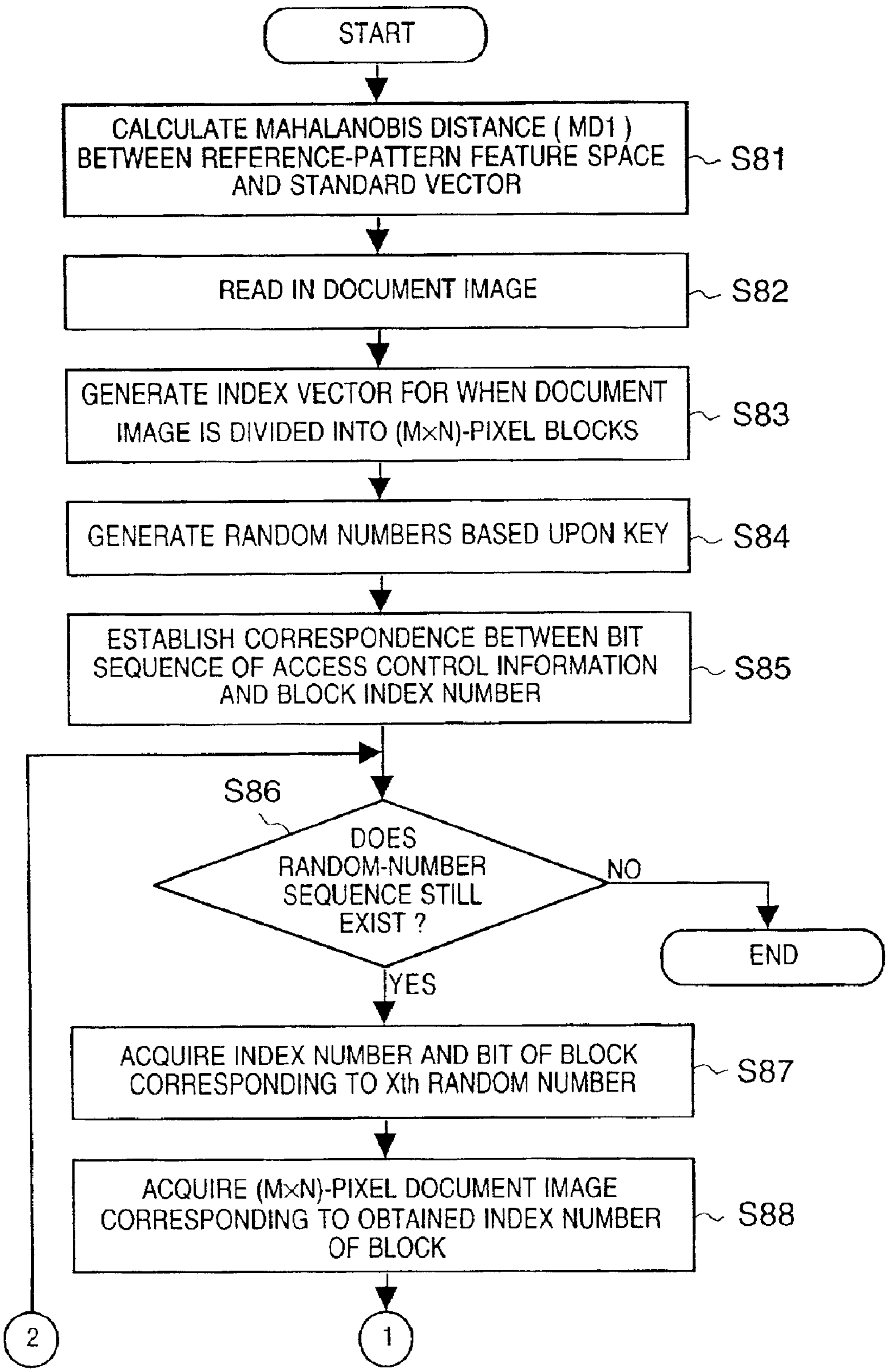
FIG. 30 is a flowchart illustrating processing, which is executed by an image processing apparatus according to a third embodiment of the present invention, for embedding access control information in a document image.
Figure 31:
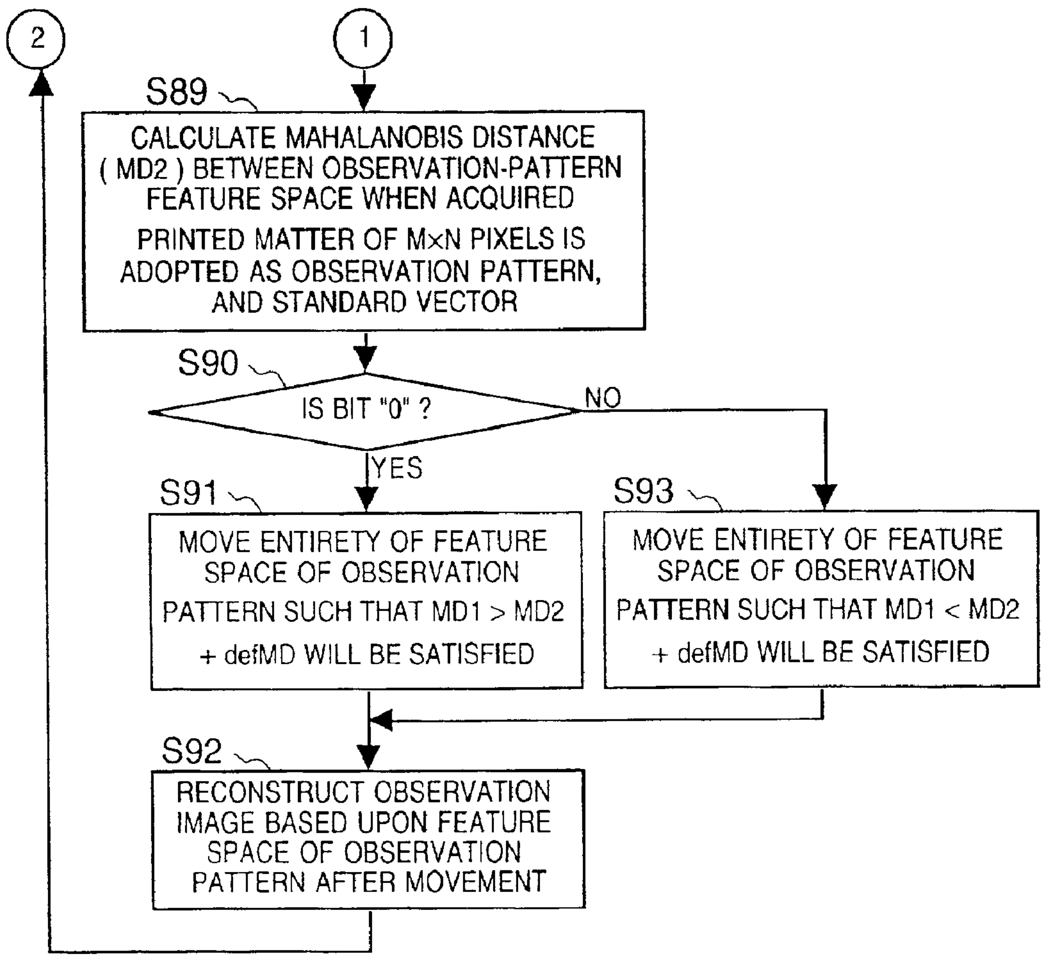
FIG. 31 is a flowchart illustrating processing, which is executed by the image processing apparatus according to the third embodiment, for embedding access control information in a document image.

FIGS. 30 and 31 are flowcharts illustrating processing for embedding access control information (watermark information) in a document image for the purpose of accessing the document image. Operation will be described with reference to these flowcharts.

First, at step S81, a Mahalanobis distance (MD1) between the feature space of a reference pattern and a standard vector is calculated. This performed in accordance with Equation (5) below.

$$D2=(x-\mu)'\Sigma^{-1}(x-\mu) \qquad \text{Eq. (5)}$$

where x represents the standard vector, $\mu$ denotes the average vector of the reference-pattern feature space, $\Sigma^{-1}$ denotes the inverse matrix of a covariance matrix of the reference-pattern feature space and D2 denotes the Mahalanobis distance (MD1) between the standard vector x and the average vector $\mu$ of the reference-pattern feature space. In a case where the standard vector and the reference pattern have already been decided, the Mahalanobis distance may be calculated in advance and stored in a memory or the like.

Figure 32:
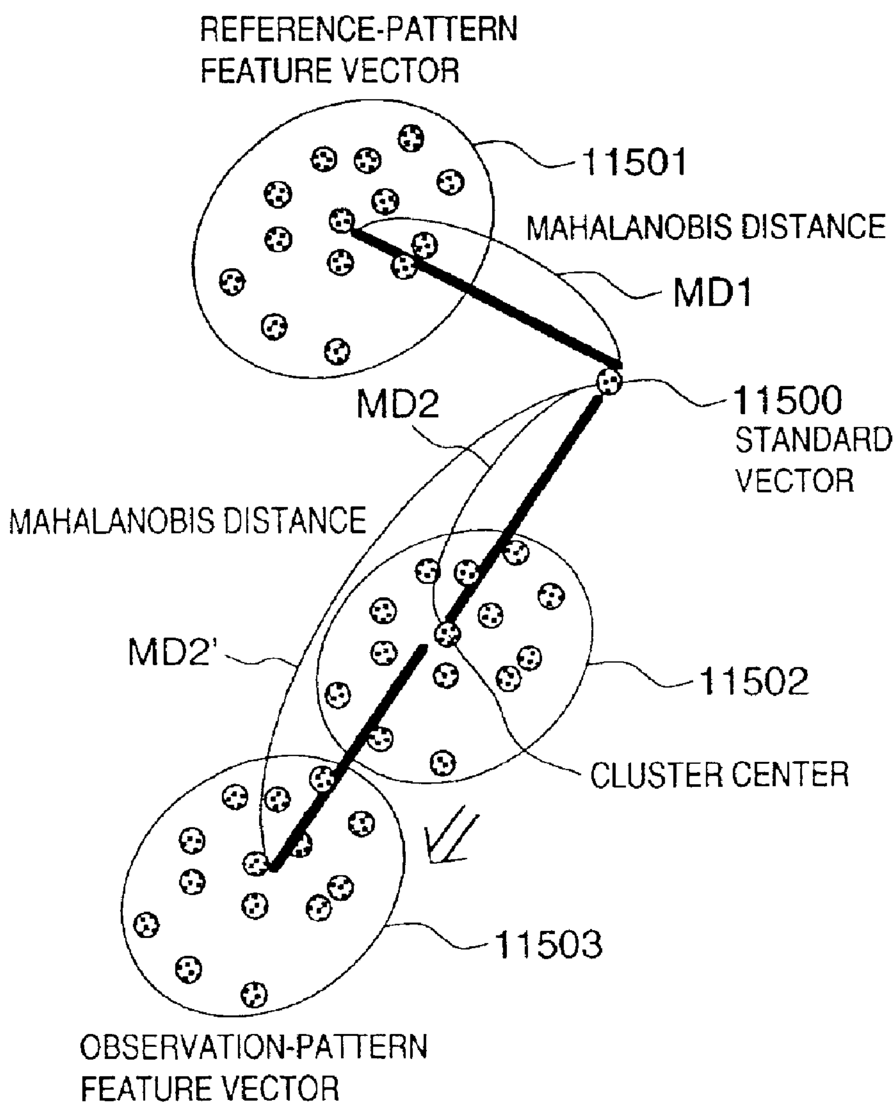
FIG. 32 is a conceptual view useful in describing the Mahalanobis distance (MD1) between the feature vector space of a reference pattern and a standard vector, and the Mahalanobis distance (MD2) between the feature vector of an observation pattern and the standard vector.

FIG. 32 is a conceptual view illustrating an example wherein a Mahalanobis distance (MD1) between the feature vector space of a reference pattern and a standard vector is obtained, and the feature vector of a document image (observation pattern), in which watermark information is to be embedded, is altered in accordance with the watermark information. Numerals 11500 and 11501 in FIG. 15 denote a standard vector and a feature vector of a reference pattern, respectively. Further, the feature vector of an observation pattern is indicated at 11502.

Next, at step S82 in FIG. 30, the document image corresponding to the binary K-image data 104 of FIG. 1 is read in. Control then proceeds to step S83, at which the document image that was read in at step S82 is divided into blocks, as shown in FIG. 16. Numerals 1601, 1602 and 1603 in FIG. 16 denote a block of M×N pixels, a row-number index of each block and a column-number index of each block, respectively. The index number in FIG. 16 is an m×n matrix. An index vector of m×n dimensions corresponding to the blocks is generated based upon the index matrix. Element numbers of the index vector are the index numbers of the blocks 1601.

Next, at step S84, random numbers from "1" to "m×n" are generated based upon key information decided in advance or entered by the user. The generated random numbers correspond to element numbers of the index vector generated at step S83. In other words, each random-number value corresponds to the index number of a block.

This is followed by step S85, at which the bit sequence (8-bit data) of the access control information shown in FIG. 12 and the index number of each block are made to correspond. When this mapping reaches the end of the bit sequence (the eighth bit in the example of FIG. 12), the mapping of the next block starts from the beginning (the first bit) of this bit sequence. This bit sequence is thus assigned repeatedly until all blocks are assigned bits of the bit sequence.

FIG. 17 illustrates an example of correspondence among the bit sequence 1701, which is watermark information, the random-number sequence 1702 generated at step S84 and the index number of each block.

Reference numerals 1701 and 1702 in FIG. 17 represent the bit sequence and the random-number sequence corresponding thereto, respectively. The number of bits in the bit sequence 1701 and the number of random numbers (R1 to Rmn), which are also the index numbers of the respective blocks, are both m×n. Further, the random number R1 in FIG. 17 corresponds to the block of index number (I,J)=(1, 1), the random number R2 corresponds to the block of index number (I,J)=(1,2) and, in similar fashion, the final random number Rmn corresponds to the block of index number (I,J)=(m,n).

Next, at step S86, it is determined whether random-number sequences up to the (m×n)th random-number sequence have been checked. If the (m×n)th random-number sequence has not yet been checked, control proceeds to step S87, at which the index number of the block [I,J=(1,1)] corresponding to the Xth ($1^{st}$) random number (random number R1 in FIG. 17) of the random-number sequence 1702, as well as the value ("0" in the example of FIG. 17) of the bit of bit sequence 1701 that corresponds to this index number, is acquired. Control then proceeds to step S88, at which the (M×N)-pixel block of the document image corresponding to the acquired index number is acquired. This is followed by step S89 (FIG. 31). This step is for calculating the Mahalanobis distance (MD2) between the feature space of an observation pattern when the obtained M×N document image is adopted as an observation image, and the standard vector. This is found on the basis of the following equation:

$$D2=(x-\mu)''\Sigma^{-1}(x-\mu) \qquad \text{Eq. (6)}$$

where x represents the standard vector, $\mu$ denotes the average vector of the observation-pattern feature space, $\Sigma^{-1}$ denotes the inverse matrix of a covariance matrix of the reference-pattern feature space and D2 denotes the Mahalanobis distance (MD2) between the standard vector x and the average vector $\mu$ of the observation-pattern feature space.

Control then proceeds to step S90, at which it is determined whether the bit of the bit sequence 1701 that corresponds to this block is "0". If the bit is "0", control proceeds to step S91, at which the entire feature space of the observation pattern is moved so as to establish the following relation:

$$MD1>MD2+defMD$$

If the bit of bit sequence 1701 corresponding to this block is found to be "1" at step S90, control proceeds to step S93, at which the entire feature space of the observation pattern is moved so as to establish the following relation:

$$MD1<MD2+defMD$$

In FIG. 32, the feature vector of the observation pattern is indicated at 11502. Reference number 11503 denotes the feature vector of the observation pattern moved at step S91 or S93. At the time of such movement, the shift is made in a direction in which there is an increase in the values of the elements of all feature vectors in the feature space of the observation pattern; there is no movement in a direction in which the values of these elements decrease.

Control proceeds from step S91 and S93 to step S92, at which the image data representing the observation image is reconstructed based upon the feature space of the observation pattern after the feature space of the observation pattern has been moved. The above is executed until random-number sequences no longer exist at step S86, i.e., until processing corresponding to the (m×n)th random number is completed.

The binary K-image data thus obtained is output to the printer engine as the binary K-image data 104 of FIG. 1 and is printed by the printer.

It should be noted that the hardware implementation of the image processing apparatus according to the third embodiment is identical with that of FIG. 1 and need not be described again.

Described next will be a case where access control information (watermark information) is extracted from an image in which an electronic watermark has been embedded in the manner described above.

Figure 34:
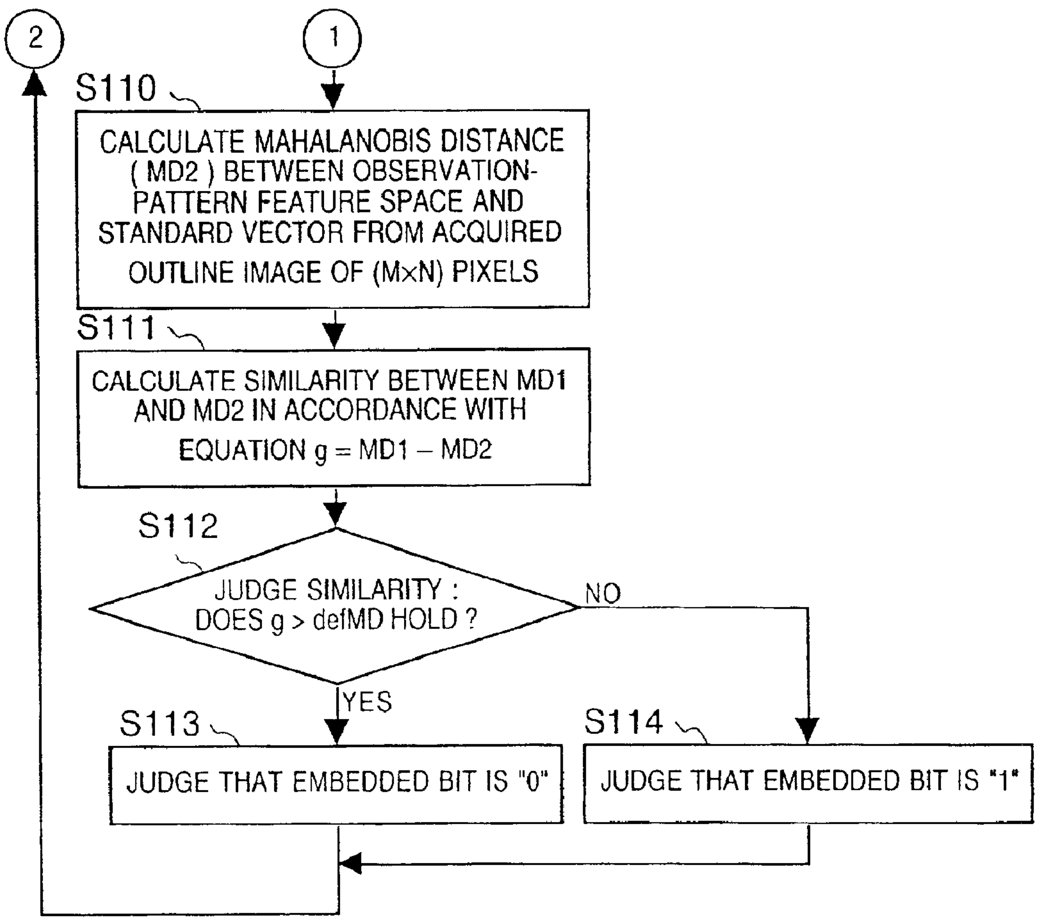
FIG. 34 is a flowchart illustrating processing for extracting access control information, which has been embedded in an image, from the printed image in the third embodiment.

FIGS. 33 and 34 are flowcharts illustrating processing for extracting access control information from a printed image in accordance with the third embodiment. The program for executing this processing has been stored in the memory 112 and is executed under the control of the CPU 111.

In a manner similar to that of step S81 in FIG. 30 described above, step S101 calls for the calculation of the Mahalanobis distance (MD1) between the reference-pattern feature space and the standard vector. Control then proceeds to step S102, at which the scanner of the image input unit 110 is used to read the printed image in a grayscale mode (8 bits/pixel). This is followed by step S103, at which the outline of the read image is extracted and an outline image in which the outline portion is made a fine line of one pixel width, as shown in FIG. 4, for example, is generated. Next, at step S104, the outline image is converted to a size that prevailed when the access control information was added on. The outline image obtained by the conversion is then subjected to the processing set forth below. It should be noted that the processing of steps S105 to S110 in FIGS. 33 and 34 is basically same as that of step S83, S84 and steps S86 to S89 in FIGS. 30 and 31 described above. At step S108, however, only the index number of the block corresponding to the Xth random number of the random-number sequence is extracted. This processing differs from that step S87.

More specifically, at step S105, the outline image is divided into (M×N)-pixel blocks and an m×n index matrix is generated from the row-number indices and column-number indices of the respective blocks, as shown in FIG. 31. An index vector of m×n dimensions is then generated from the index matrix. The element numbers of the index vector are the index numbers of the respective blocks.

Control then proceeds to step S106, at which 1 to m×n random numbers are generated based upon key information decided in advance or entered by the user. The generated random numbers correspond to the element numbers of the index vector generated at step S105. In other words, each random-number value corresponds to the index number of a block. Next, at step S107, it is determined whether a random-number sequence still exists, i.e., whether the processing of all blocks has been completed. If processing has not been completed for all blocks, control proceeds to step S108, at which the index number of the block corresponding to the Xth ($1^{st}$) random number (random number R1) is acquired. This is followed by step S109, at which the (M×N)-pixel outline image corresponding to the index number of the acquired block is obtained. Control then proceeds to step S110 (FIG. 34). This step is for calculating the Mahalanobis distance (MD2) between the feature space of an observation pattern when the obtained M×N document image is adopted as an observation image, and the standard vector. This can be found in accordance with Equation (6) cited above.

Next, control proceeds to step S111, at which the degree of similarity (g) between the Mahalanobis distance (MD1) and Mahalanobis distance (MD2) thus obtained is calculated. The degree of similarity (g) at this time is calculated in accordance with the following equation:

$$g=MD1-MD2$$

Next, at step S112, the calculated similarity (g) and a predetermined value (defMD) are compared. If g>defMD holds, control proceeds to step S113 and it is decided that the embedded bit is "0". If it is found that g>defMD does not hold at step S112, then control proceeds to step S114, at which it is decided that the embedded bit is "1". Control returns to step S117 after step S113 or step S114 is executed. The processing of steps S108 to S114 is executed repeatedly until the above-described processing is applied to the (m×n) th random number. Thus, a number of decisions are rendered on the basis of the extracted bit sequence and the bit length that prevailed when the access control information was embedded is reconstructed.

Thus, in accordance with the third embodiment as described above, desired control information can be embedded without degrading the image that receives the embedded information.

Further, control information that has been embedded in an image can be read and detected with high precision.

Fourth Embodiment

A fourth embodiment of the present invention will now be described. It should be noted that the hardware implementation of the fourth embodiment also is identical with that of the foregoing embodiments (FIG. 18) and need not be described again.

First, on the basis of the binary observation image comprising M×N pixels in FIG. 3, the outline of the binary observation image is extracted to obtain an outline image in which the outline is made a fine line of one pixel, as shown in FIG. 4. FIG. 5 described earlier is a diagram illustrating direction indices for extracting the features of a pixel of interest Pij in a case where the pixel of interest is located at the center of a 3×3 pixel block. FIG. 35 illustrates values corresponding to the features t1, t2, t3, t4, t5, t6, t7 and t8 of the direction indices of the pixel of interest shown in FIG. 5. In contradistinction to FIG. 6, here a "0" indicates the presence of a pixel in the direction of the corresponding direction index and a "1" the absence of a pixel in the direction of the corresponding direction index.

Figure 36:
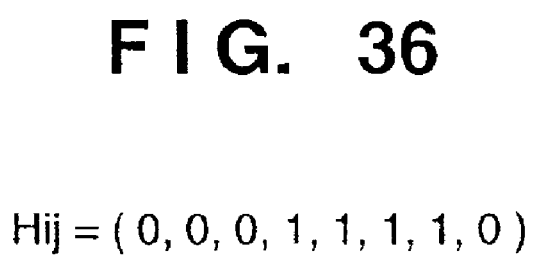

FIG. 36 illustrates vectorization of the features (see FIG. 35) of the direction indices of the pixel of interest Pij shown in FIG. 5. Here the feature vector Hij of the direction indices is a vector of the features of the direction indices of the pixel of interest Pij. This vector has eight dimensions.

The feature space of the observation pattern in this case is a set of feature vectors of direction indices for a case where each outline point of the outline images obtained in FIG. 4 is adopted as the pixel of interest of FIG. 5 in the binary observation image obtained in FIG. 3. Further, the feature space of the observation pattern has eight dimensions. The standard vector represents the features of the direction indices of the pattern shown in FIG. 8.

FIG. 37 illustrates a vector DIST indicating the features of the direction indices of FIG. 8. This vector has eight dimensions. Here also "0" indicates the presence of a pixel in the particular direction and "1" the absence of a pixel in the particular direction.

The feature space of a reference pattern in this case is a set of feature vectors of direction indices of each of the pixels in the outline image (see FIG. 11 of the first embodiment) of the reference image (see FIG. 10 of the first embodiment) of S×T pixels.

It is assumed that the access control information (watermark information) in the fourth embodiment is identical with the data of FIG. 12 according to the foregoing embodiments.

The feature space of an observation pattern, a standard vector and the feature space of a reference pattern relating to access control information in accordance with the fourth embodiment of the invention will now be described.

Figure 38:
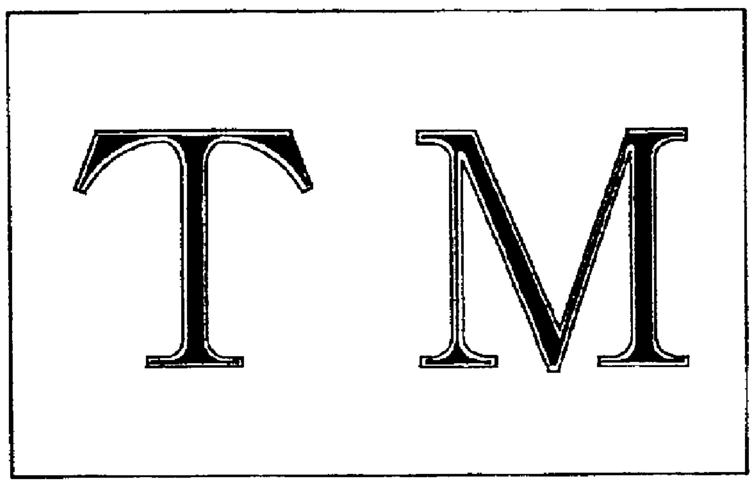
FIG. 38 is a diagram illustrating an example of an observation image (document image) of M×N pixels.
Figure 39:
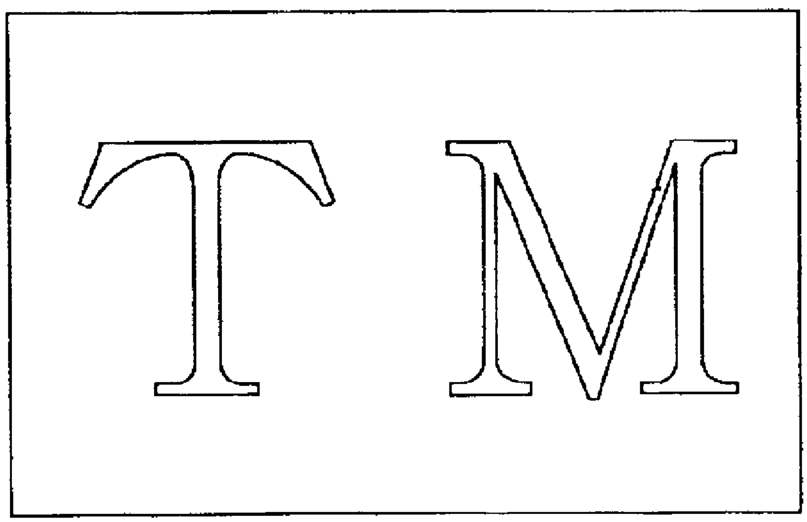
FIG. 39 is a diagram illustrating an example of an outline image in which the outline of the observation image of FIG. 38 is indicated by one pixel.
Figure 40:
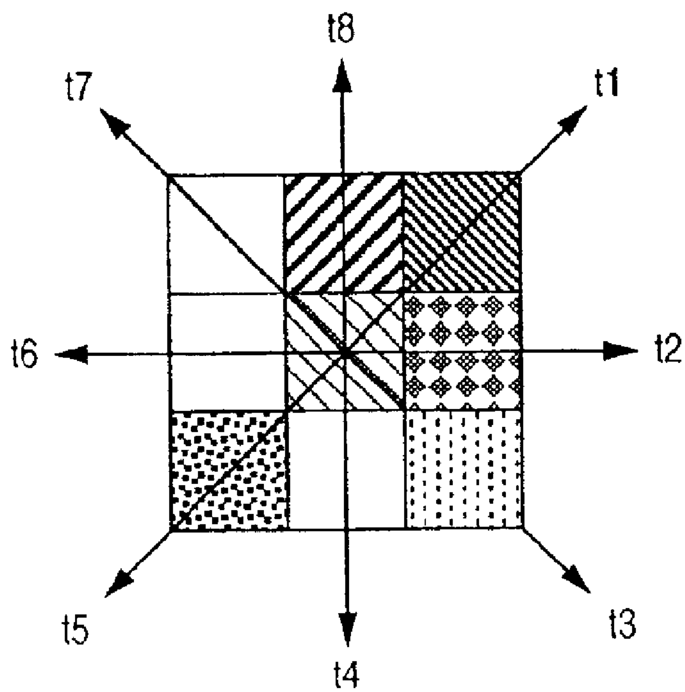
FIG. 40 is a diagram useful in describing the features of the direction indices of a pixel of interest.

FIG. 38 illustrates an example of an (M×N)-pixel multilevel grayscale observation image corresponding to part of the data 201 in FIG. 2. FIG. 39 is a diagram illustrating an outline image in which the outline of the multilevel grayscale observation image of FIG. 38 is extracted and made a fine line of one pixel. FIG. 40 is a diagram illustrating direction indices for extracting the features of the pixel of interest Pij in a case where the pixel of interest is located at the center of a 3×3 pixel block. FIG. 40 illustrates a case where "128", "150", "198", "255", "240", "255", "255" and "0" are the pixel values in the directions t1, t2, t3, t4, t5, t6, t7 and t8, respectively, of the pixel of interest.

FIG. 41 illustrates pixel values corresponding to the features t1, t2, t3, t4, t5, t6, t7 and t8 of the direction indices of the pixel of interest shown in FIG. 40. FIG. 42 illustrates vectorization of the features of the direction indices of the pixel of interest Pij shown in FIG. 41. Here the feature vector Hij of the direction indices is a vector of the features of the direction indices of the pixel of interest Pij. This vector has eight dimensions.

The feature space of the observation pattern is a set of feature vectors of direction indices for a case where each outline point of the outline images obtained in FIG. 39 is adopted as the pixel of interest of FIG. 5 in the multilevel grayscale observation image obtained in FIG. 38. Further, the feature space of the observation pattern has eight dimensions. The standard vector represents the features of the direction indices of the pattern shown in FIG. 43.

Figure 43:
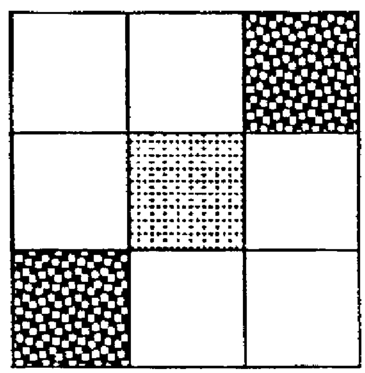
FIG. 43 is a diagram illustrating an example of the image of a standard vector according to the fourth embodiment.

FIG. 44 illustrates a vector DIST of the features of the direction indices shown in FIG. 43. This vector has eight dimensions.

The feature space of the reference pattern is a set of feature vectors of direction indices of each of the pixels in the outline image (see FIG. 11) of the reference image (see FIG. 10) of S×T pixels. It is assumed that the feature space of the reference pattern has eight dimensions.

A procedure for embedding access control information in a document image according to the fourth embodiment of the present invention will be illustrated next.

Figure 45:
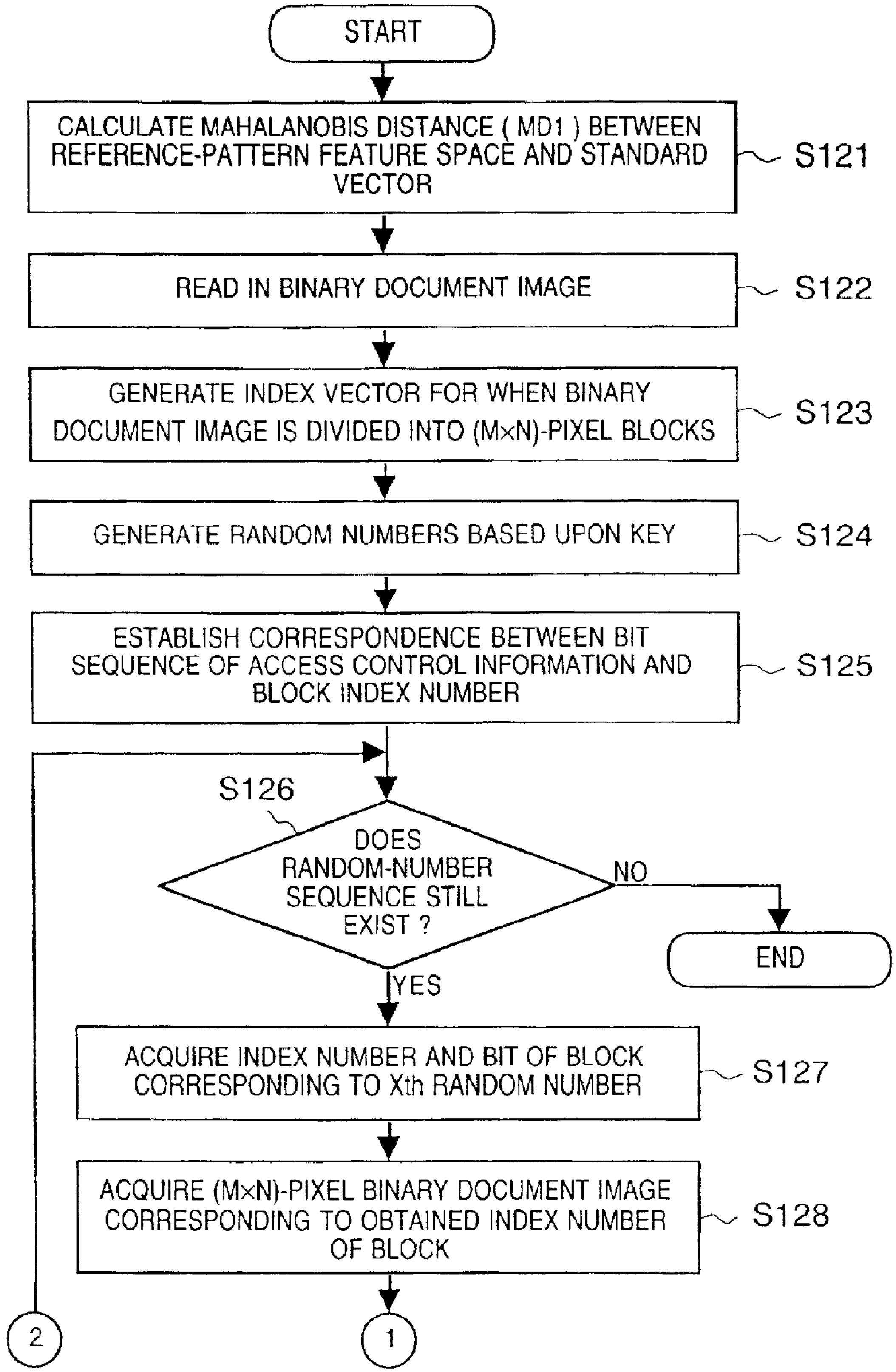
FIG. 45 is a flowchart illustrating processing, which is executed by an image processing apparatus according to the fourth embodiment, for embedding access control information in a document image.
Figure 46:
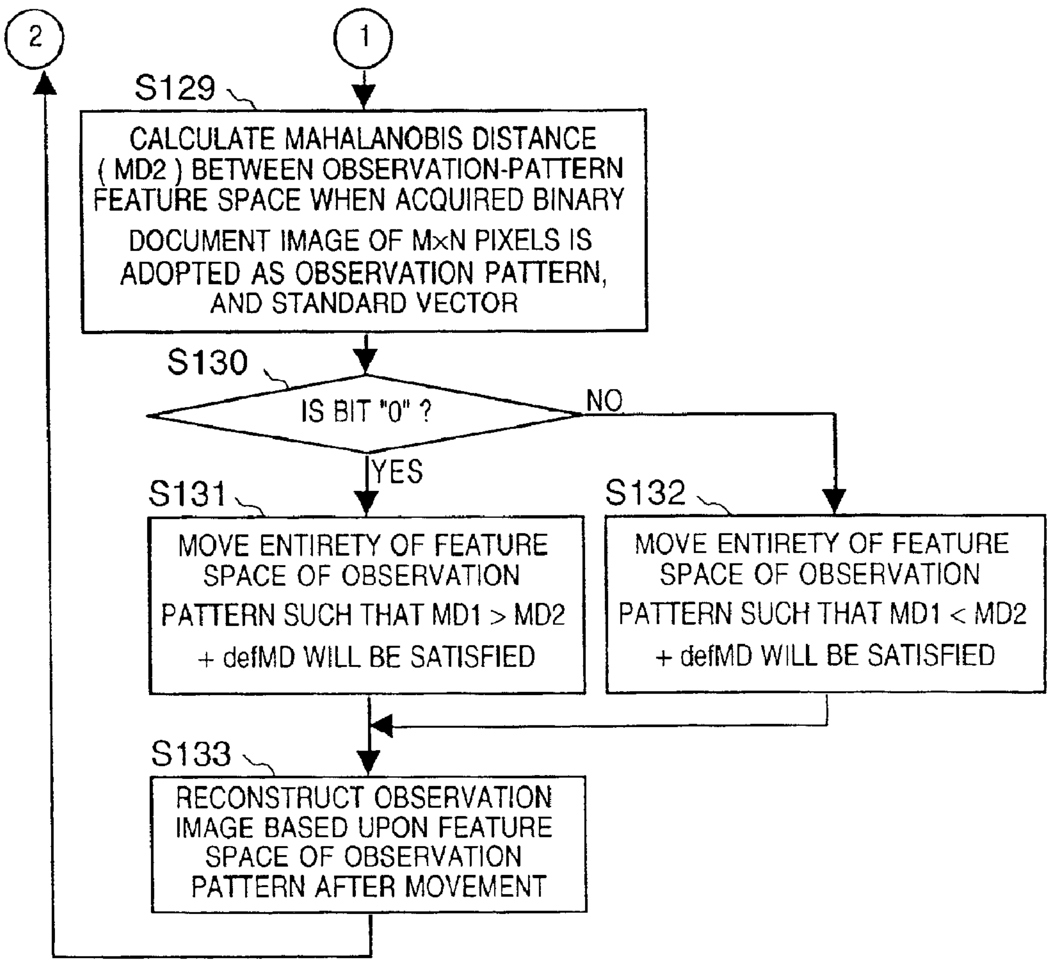
FIG. 46 is a flowchart illustrating processing, which is executed by an image processing apparatus according to the fourth embodiment, for embedding access control information in a document image.

FIGS. 45 and 46 are flowcharts illustrating processing for embedding access control information in a document image according to the fourth embodiment.

First, at step S121, the Mahalanobis distance (MD1) between the feature space of a reference pattern and a standard vector is calculated. This performed in accordance with the following equation:

$$D2=(x-\mu)'\Sigma^{-1}(x-\mu)$$

where x represents the standard vector, $\mu$ denotes the average vector of the reference-pattern feature space, $\Sigma^{-1}$ denotes the inverse matrix of a covariance matrix of the reference-pattern feature space and D2 denotes the Mahalanobis distance (MD1) between the standard vector x and the average vector $\mu$ of the reference-pattern feature space.

Next, at step S122, the binary document image corresponding to data 104 of FIG. 1 is read in. Control then proceeds to step S123, at which the binary document image is divided into (M×N)-pixel blocks, as illustrated in FIG. 16. Numerals 1601, 1602 and 1603 in FIG. 16 denote a block of M×N pixels, a row-number index and a column-number index, respectively. The index number in FIG. 16 is an m×n matrix. An index vector of m×n dimensions is generated from this index matrix. Element numbers of the index vector are the index numbers of the blocks.

Next, at step S124, random numbers from "1" to "m×n" are generated based upon key information decided in advance or entered by the user. The generated random numbers correspond to element numbers of the index vector generated at step S123. In other words, each random-number value corresponds to the index number of a block.

This is followed by step S125, at which the bit sequence (see FIG. 12) of the access control information (watermark information) and the index number of each block are made to correspond. When this mapping reaches the end of the bit sequence, the mapping of the next block starts from the beginning of this bit sequence. Next, at step S126, it is determined whether a random-number sequence still exists. If the answer is "YES", control proceeds to step S127.

FIG. 17 is a diagram showing an example of correspondence among the bit sequence, random-number sequence and index number of each block. The number of random numbers of the bit sequence 1701 and the number of block index numbers constituting the random-number sequence are both m×n.

The index number of the block corresponding to the Xth ($1^{st}$) random number, as well as the bit thereof, is acquired at step S127. This is followed by step S128, at which the M×N binary document image corresponding to the index number of the acquired block is obtained. Control then proceeds to step S129 (FIG. 46). This step is for calculating the Mahalanobis distance (MD2) between the feature space of an observation pattern when the obtained M×N binary document image is adopted as an observation image, and the standard vector. This is found on the basis of the following equation:

$$D2=(x-\mu)'\Sigma^{-1}(x-\mu)$$

where x represents the standard vector, $\mu$ denotes the average vector of the observation-pattern feature space, $\Sigma^{-1}$ denotes the inverse matrix of a covariance matrix of the observation-pattern feature space and D2 denotes the Mahalanobis distance (MD2) between the standard vector x and the average vector $\mu$ of the observation-pattern feature space.

Control then proceeds to step S130. If the bit of the access control information is "0", control proceeds to step S131, at which the entire feature space of the observation pattern is moved so as to establish the relation MD1>MD2+defMD. If the bit of the access control information is "1", on the other hand, control proceeds to step S132, at which the entire feature space of the observation pattern is moved so as to establish the relation MD1<MD2+defMD. Here "defMD" represents a value set in advance.

The movement of the entirety of feature space at step S131, S132 is made in a direction in which there is an increase in the values of the elements of all feature vectors in the feature space of the observation pattern; there is no movement in a direction in which the values of these elements decrease.

Control proceeds from step S131 and S133 to step S133, at which the observation image is reconstructed based upon the feature space of the observation pattern after movement. Similar processing is executed up to the (m×n)th random number of the random-number sequence.

The binary K-image data thus obtained is delivered to the printer engine as the binary K-image data 104 of FIG. 1 and is printed on a printing paper.

Described next will be processing for extracting access control information (watermark information) from printed matter that has been printed following the embedding of the watermark information.

Figure 47:
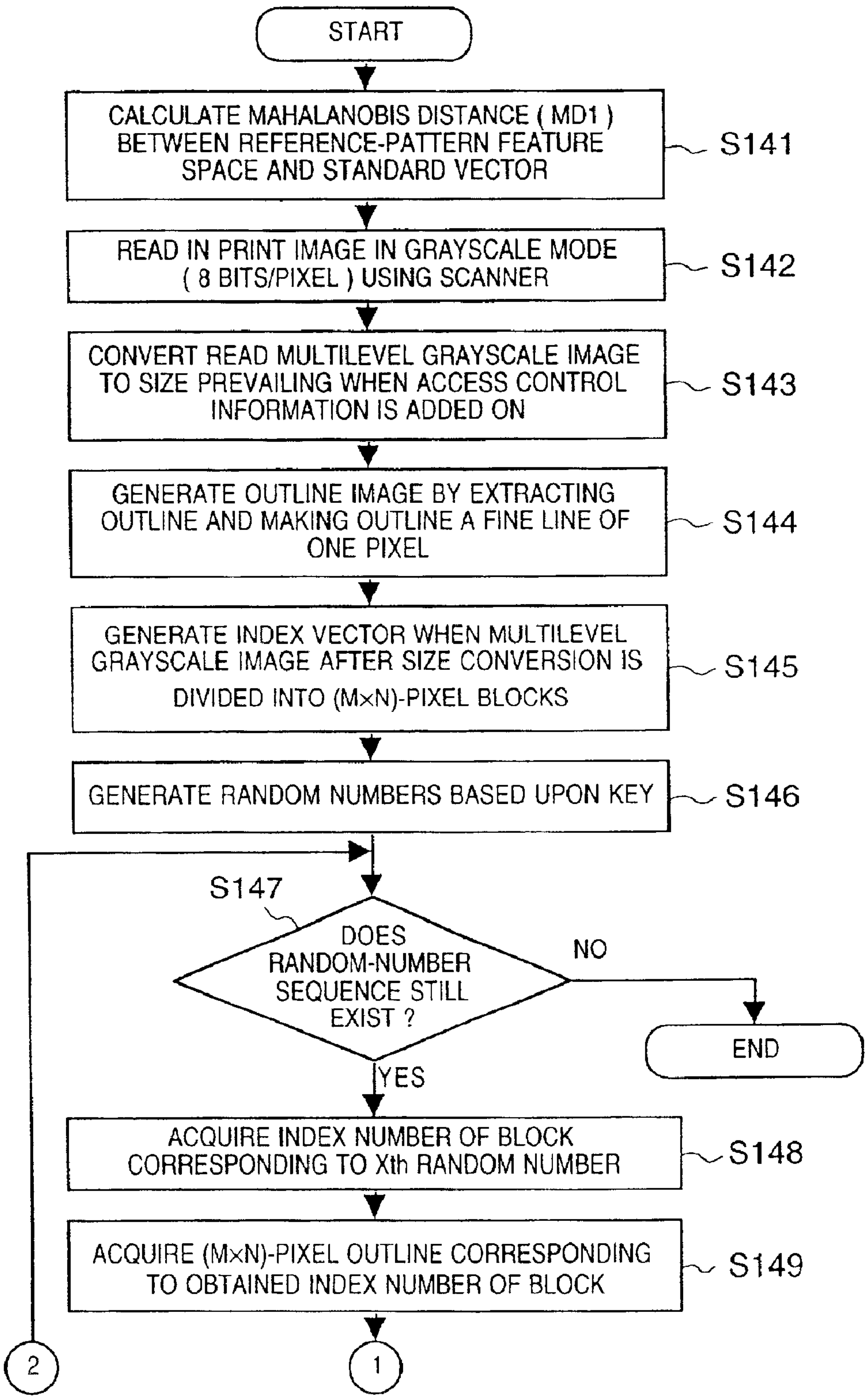
FIG. 47 is a flowchart illustrating processing for extracting access control information, which has been embedded in an image, from the printed image according to the fourth embodiment.
Figure 48:
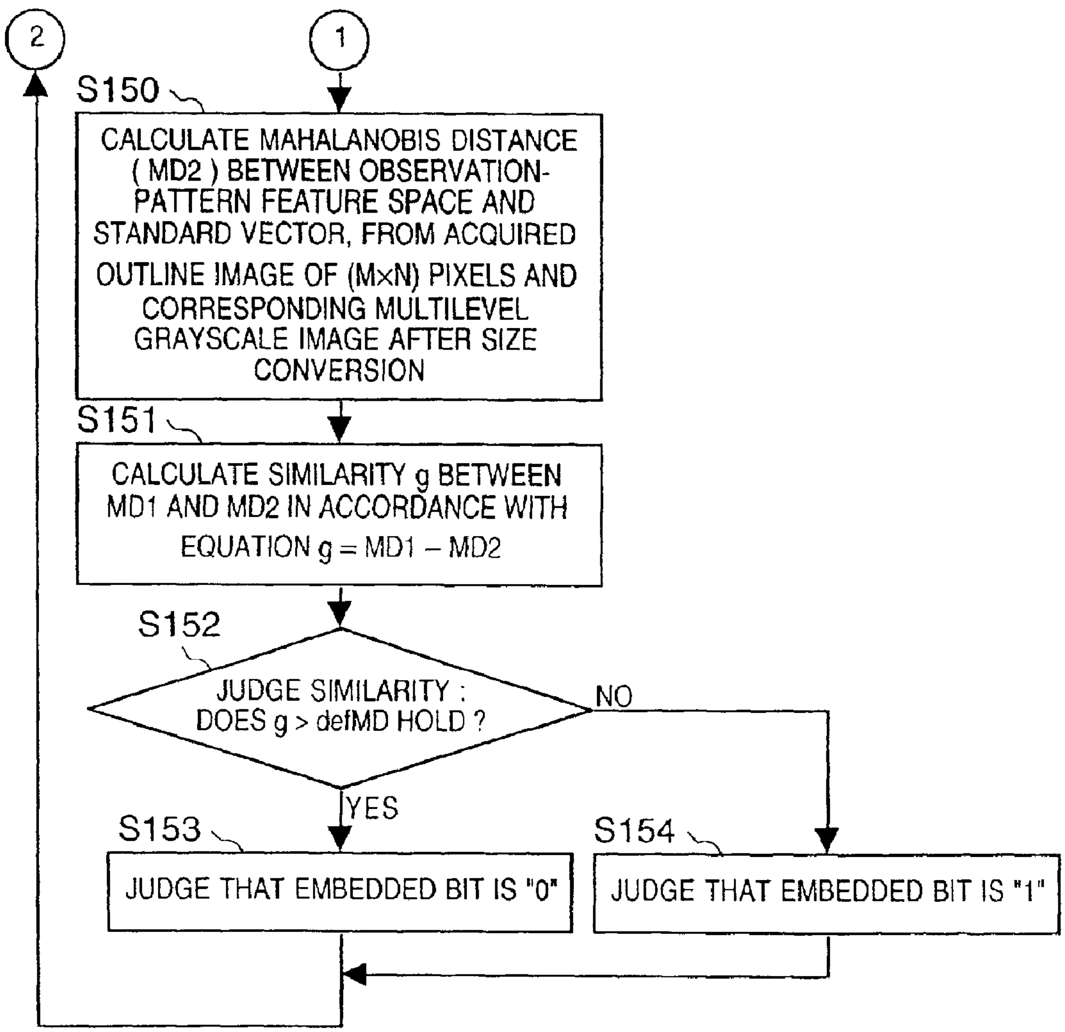
FIG. 48 is a flowchart illustrating processing for extracting access control information, which has been embedded in an image, from the printed image according to the fourth embodiment.

FIG. 47 is a flowchart illustrating processing for extracting watermark information that has been embedded. First, step S141 calls for the calculation of the Mahalanobis distance (MD1) between the reference-pattern feature space and the standard vector. This is found on the basis of the following equation:

$$D2=(x-\mu)'\Sigma^{-1}(x-\mu)$$

where x represents the standard vector, $\mu$ denotes the average vector of the reference-pattern feature space, $\Sigma^{-1}$ denotes the inverse matrix of a covariance matrix of the reference-pattern feature space and D2 denotes the Mahalanobis distance (MD1) between the standard vector x and the average vector $\mu$ of the reference-pattern feature space.

Control then proceeds to step S142, at which the scanner is used to read the printed matter in a grayscale mode (8 bits/pixel). This is followed by step S143, at which the multilevel grayscale image that has been read is converted to a size that prevailed when the access control information was added on. Next, at step S144, the outline is extracted and an outline image in which the outline portion is made a fine line of one pixel width is generated.

More specifically, at step S143, the multilevel grayscale image resulting from the size conversion is divided into (M×N)-pixel blocks, as shown in FIG. 16. Numerals 1601, 1602 and 1603 in FIG. 16 denote a block of M×N pixels, a row-number index and a column-number index, respectively. The index number is an m×n matrix. An index vector of m×n dimensions is generated from this index matrix. Element numbers of the index vector are the index numbers of the blocks.

Next, at step S146, random numbers from "1" to "m×n" are generated based upon key information decided in advance or entered by the user. The generated random numbers correspond to element numbers of the index vector generated at step S145. In other words, each random-number value corresponds to the index number of a block.

The index number of the block corresponding to the Xth ($1^{st}$) random number is acquired at step S148. This is followed by step S149, at which the M×N outline image corresponding to the index number of the acquired block is obtained. Control then proceeds to step S150. This step is for calculating the Mahalanobis distance (MD2) between the feature space of an observation pattern and the standard vector. This is calculated from the obtained M×N outline image and the corresponding multilevel grayscale image following the size conversion. This is found on the basis of the following equation:

$$D2=(x-\mu)'\Sigma^{-1}(x-\mu)$$

where x represents the standard vector, $\mu$ denotes the average vector of the observation-pattern feature space, $\Sigma^{-1}$ denotes the inverse matrix of a covariance matrix of the observation-pattern feature space and D2 denotes the Mahalanobis distance (MD2) between the standard vector x and the average vector $\mu$ of the observation-pattern feature space.

Next, control proceeds to step S151, at which the degree of similarity (g) between the Mahalanobis distance (MD1) and Mahalanobis distance (MD2) thus obtained is calculated. The degree of similarity (g) at this time is calculated in accordance with the following equation:

$$g=MD1-MD2$$

Next, at step S152, the calculated similarity (g) and "defMD" are compared. If g>defMD holds, control proceeds to step S153 and it is decided that the embedded bit is "0". If it is found that g>defMD does not hold, on the other hand, then control proceeds to step S154, at which it is decided that the embedded bit is "1". It should be noted that "defMD" is a value set in advance. Similar processing is executed until the final random-number sequence, i.e., the (m×n)th, is detected at step S147. Thus, a number of decisions are rendered on the basis of the extracted bit sequence and the bit length that prevailed when the access control information was embedded is reconstructed.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes. In this case, the program codes read from the storage medium implement the novel functions of the embodiments and the storage medium storing the program codes constitutes the invention. Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the functions of the above embodiments.

Further, through the embodiments have been described independently of one another, this does not impose a limitation upon the present invention, which also covers cases where the foregoing embodiments are implemented in upon being suitable combined.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:

image input means for inputting an image;

extraction means for extracting an outline of the image that has been input by said image input means;

vector generating means for generating vector information conforming to state of pixels neighboring each pixel constituting the output that has been extracted by said extraction means; and embedding means for altering the image in accordance with watermark information and embedding the watermark information on the basis of the vector information.

2. The apparatus according to claim 1, wherein the vector information is 8-dimension vector information indicating whether there are eight pixels neighboring a pixel of interest.

3. An image processing method comprising:

an image input step of inputting an image;

an extraction step of extracting an outline of the image that has been input at said image input step;

a vector generating step of generating vector information conforming to state of pixels neighboring each pixel constituting the output that has been extracted at said extraction step; and an embedding step of altering the image in accordance with watermark information and embedding the watermark information on the basis of the vector information.

4. The method according to claim 3, wherein the vector information is 8-dimension vector information indicating whether there are eight pixels neighboring a pixel of interest.

5. A computer-readable storage medium storing a program for executing an image processing method for processing an input image, said storage medium comprising:

a module for an image input step of inputting an image;

a module for an extraction step of extracting an outline of the image that has been input by the module for said image input step;

a module for a vector generating step of generating vector information conforming to state of pixels neighboring each pixel constituting the output that has been extracted by the module for said extraction step; and a module for an embedding step of altering the image in accordance with watermark information and embedding the watermark information on the basis of the vector information.

6. An image processing apparatus, comprising:

input means for inputting image data;

pattern obtaining means for obtaining pattern information including neighboring pixels of each pixel consisting of an outline of an image represented by the image data inputted by said input means, wherein the neighboring pixels include at least one pixel adjacent to a pixel of interest in each of horizontal, vertical and oblique directions of the pixel of interest; and embedding means for embedding watermark information into the image data based on the pattern information, by modifying the image data in accordance with the watermark information.

7. The apparatus according to claim 6, wherein the pattern information includes pixels of neighboring eight pixels of the pixel of interest.

8. An image processing method, comprising the steps of:

inputting image data;

obtaining pattern information including neighboring pixels of each pixel consisting of an outline of an image represented by the image data inputted in said inputting step, wherein the neighboring pixels include at least one pixel adjacent to a pixel of interest in each of horizontal, vertical and oblique directions of the pixel of interest; and embedding watermark information into the image data based on the pattern information, by modifying the image data in accordance with the watermark information.

9. The method according to claim 8, wherein the pattern information includes pixels of neighboring eight pixels of the pixel of interest.

10. A computer-readable storage medium storing a program executing an image processing method according to claim 8.

* * * * *

UNITED STATES PATENT AND TRADEMARK OFFICE

CERTIFICATE OF CORRECTION

PATENT NO. : 6,937,741 B1 Page 1 of 1
DATED : August 30, 2005
INVENTOR(S) : Miyashita It is certified that error appears in the above-identified patent and that said Letters Patent is hereby corrected as shown below:

Column 8,
Line 58, "input," should read -- input. --.

Column 14,
Line 30, "This performed" should read -- This is performed --.

Column 19,
Line 6, "This performed" should read -- This is performed --.

Column 20,
Line 27, "embedded. First," should read -- embedded. (New Paragraph) First, --.

Column 21,
Line 66, "through" should read -- though --.

Column 22,
Line 2, "in" should be deleted.
Line 3, "suitable" should read -- suitably --.

Signed and Sealed this

Twenty-eighth Day of February, 2006

JON W. DUDAS
*Director of the United States Patent and Trademark Office*